United States Patent
Carmel et al.

(10) Patent No.: US 8,510,404 B2
(45) Date of Patent: Aug. 13, 2013

(54) PEER TO PEER SYNCHRONIZATION SYSTEM AND METHOD

(75) Inventors: Sharon Carmel, Tel-Aviv (IL); Yoav Borer, Tel Aviv (IL); Ofer Herman, Ein-Sarid (IL); Chico Manobela, Tel-Aviv (IL); Omer Paran, Kefar Saba (IL)

(73) Assignee: Kinglite Holdings Inc., Singapore (SG)

( * ) Notice: Subject to any disclaimer, the term of this patent is extended or adjusted under 35 U.S.C. 154(b) by 414 days.

(21) Appl. No.: 12/295,951

(22) PCT Filed: Apr. 10, 2007

(86) PCT No.: PCT/IL2007/000452
§ 371 (c)(1),
(2), (4) Date: Oct. 3, 2008

(87) PCT Pub. No.: WO2007/113836
PCT Pub. Date: Oct. 11, 2007

(65) Prior Publication Data
US 2009/0172201 A1    Jul. 2, 2009

Related U.S. Application Data

(60) Provisional application No. 60/788,039, filed on Apr. 3, 2006.

(51) Int. Cl.
*G06F 15/16* (2006.01)
*G06F 7/00* (2006.01)

(52) U.S. Cl.
USPC ............... 709/214; 709/248; 707/622

(58) Field of Classification Search
None
See application file for complete search history.

(56) References Cited

U.S. PATENT DOCUMENTS

| | | | |
|---|---|---|---|
| 5,781,545 A | 7/1998 | Matthew | |
| 5,924,096 A | 7/1999 | Draper et al. | |
| 5,968,131 A * | 10/1999 | Mendez et al. | 709/246 |
| 5,978,813 A | 11/1999 | Foltz et al. | |
| 6,052,695 A | 4/2000 | Abe et al. | |
| 6,330,568 B1 * | 12/2001 | Boothby et al. | 1/1 |
| 6,477,545 B1 * | 11/2002 | LaRue | 707/625 |
| 6,633,924 B1 * | 10/2003 | Wu et al. | 719/328 |
| 6,879,989 B2 | 4/2005 | Cheng et al. | |
| 6,892,210 B1 * | 5/2005 | Erickson et al. | 1/1 |
| 6,925,476 B1 * | 8/2005 | Multer et al. | 1/1 |
| 6,985,915 B2 | 1/2006 | Somalwar et al. | |
| 7,085,779 B2 * | 8/2006 | Holtz et al. | 1/1 |
| 7,177,865 B2 * | 2/2007 | Sasaki et al. | 1/1 |
| 7,225,231 B2 * | 5/2007 | Mendez et al. | 709/206 |
| 7,337,193 B1 * | 2/2008 | Mills et al. | 1/1 |

(Continued)

*Primary Examiner* — Patrice Winder
(74) *Attorney, Agent, or Firm* — Lowe Hauptman Ham & Berner, LLP

(57) ABSTRACT

A method and system for enabling peer to peer synchronization between members of a synchronized network. A predefined synchronization reference area on each member of the network is provided. A common identifier associated with the synchronization network is provided to each member. Changes are detected on a member regarding a data item. A network identifier associated is obtained. A unique identifier of a synchronization module is obtained. A relative path to the data item within the predefined synchronization reference area is obtained. A unique value is calculated based upon a content of a version of the data item that is associated with the change. A log number counter is incremented. A log representing the data item and the chance is created. The log includes data regarding the type of change, the network identifier, the unique identifier of the synchronization module, the relative path, the unique value, and the log number.

14 Claims, 15 Drawing Sheets

(56) References Cited

U.S. PATENT DOCUMENTS

| | | | |
|---|---|---|---|
| 7,401,104 B2 * | 7/2008 | Shah et al. | 707/620 |
| 7,483,923 B2 * | 1/2009 | Novik | 1/1 |
| 7,512,638 B2 * | 3/2009 | Jhaveri et al. | 1/1 |
| 7,606,881 B2 * | 10/2009 | Chasman et al. | 709/221 |
| 7,743,019 B2 * | 6/2010 | Shah et al. | 707/610 |
| 7,743,022 B2 * | 6/2010 | Kaasten et al. | 707/612 |
| 2001/0048728 A1 * | 12/2001 | Peng | 375/354 |
| 2002/0059299 A1 * | 5/2002 | Spaey | 707/104.1 |
| 2003/0182278 A1 | 9/2003 | Valk | |
| 2004/0015456 A1 * | 1/2004 | Holtz et al. | 706/11 |
| 2004/0172423 A1 * | 9/2004 | Kaasten et al. | 707/201 |
| 2004/0267834 A1 * | 12/2004 | Sasaki et al. | 707/201 |
| 2005/0044187 A1 * | 2/2005 | Jhaveri et al. | 709/219 |
| 2006/0195595 A1 * | 8/2006 | Mendez et al. | 709/229 |
| 2006/0242443 A1 * | 10/2006 | Talius et al. | 713/400 |
| 2007/0118577 A1 | 5/2007 | East | |
| 2007/0294366 A1 * | 12/2007 | Ozzie et al. | 709/217 |

* cited by examiner

PEER TO PEER SYNCHRONIZATION SYSTEM AND METHOD

CROSS REFERENCE TO RELATED APPLICATIONS

This invention claims the benefit of U.S. Provisional Patent Application Ser. No. 60/788,039, filed on Apr. 3, 2006 which is hereby incorporated by reference in its entirety.

FIELD OF THE INVENTION

The present invention is directed towards a system and a network for enabling peer to peer synchronization between two or more members of a peer to peer synchronization network.

BACKGROUND OF THE INVENTION

No one can argue that computers, computing systems, and data communication networks have changed the way in which people live, work, play and communicate. Some have even gone so far as to state that distributed communications network, made possible by modern computing and communication devices, are responsible for the greatest sociological paradigm shift since the industrial revolution. For example, due to the proliferation of modern computing devices and distributed communication networks, which are capable of carrying voice, video, data, and various other formats of communication, many modern workers have been freed from having to be located at any fixed point or location in order to accomplish their day to day tasks. Telecommuting and online collaboration are ever increasing trends.

Along with the benefits that come with being able to work from one or multiple computing devices located in any one of a number of places, there come certain complications and drawbacks which have not yet been sufficiently addressed. Namely, since mobile users may use multiple devices, it may be difficult and/or tedious work to synchronize data across all the devices a person may use, thus allowing access to the most up to date data when and where it is required. Since data may be scattered (e.g. replicated) over different devices and locations, changes to data made on one device may not be propagated to a second or third device used by the same user, and thus when the user attempts to access the altered data from another device, the data may not be up-to-date. This same problem may be faced by a group of people who are collaboratively working on and sharing certain data. Changes made by one group member on a data unit on his or her device may not be reflected on a copy of the data unit residing on a second group member's device, and thus group members may find themselves out of sync, working of diverging documents.

Although there are some solutions which have attempted to the address the above mentioned problem, such as Virtual Private Networks ("VPNs") to allow remote access, these solutions are complex, expensive, and force users to actively connect to a server before proceeding. These solutions do not allow offline access and, since data is not replicated, do not automatically keep a backup of the users' data. Therefore, there is a need for a solution which will allow users to work seamlessly across multiple devices (e.g. PC, laptop, PDA, mobile phone), residing in multiple locations (e.g. home, office, on the go) while maintaining all their desired data (e.g. files, pictures, emails, etc.) available to them at all time. Furthermore, there is a need for a solution which will allow users to transfer data to others and/or collaborate with other users in a shared environment. There is a need for each of the above mentioned solutions to be operable both when a user's device is connected (e.g. online), through a communication network, to other devices in the collaborative environment, and just as importantly when the user's device is not connected (e.g. offline).

The system and methods described herein are different from what is known in the art for synchronization and replication solution, in the following manners: The solution presented herein enables a synchronization application to locally process and achieve synchronization independently on changes generated by other synchronization application(s) in a reference to items or group of items that the two or more synchronization application(s) are assigned to synchronize. It may be clarified that by locally process and achieve synchronization independently the synchronization application may process the received changes without being advised by any other applications including but not limited to the Synchronization Service and any of the other Synchronization Applications. It may be further clarified that locally processing the logs and achieving synchronization independently is opposed to what is known in the Art as Master Slave relations. Master Slave relations relation is when one application is controlling or telling the other application what to do in order to achieve synchronization. Locally processing the received changes and achieving synchronization independently is also opposed to what is known in the are as centralized synchronization systems or server based synchronization systems where the centralized server is actually the master for synchronization, in the case were you have millions of folders to synchronize the cost related to the centralized server may be very high.

Locally processing the changes and achieving synchronization independently is desirable in a P2P system described herein were the number of synchronization applications may be unlimited and the processing resources are distributed among the peers as opposed to centralized servers and high capacity networks needed in order to process million of synchronization changes per second with very high associated cost. Locally processing the changes and achieving synchronization independently is desirable in a P2P system because some of the synchronization application my not be online 24/7 and the presence of many pears can help achieve synchronization even if some of the peers are not online using change relay technique of transferring changes of offline peers using the online peers. Locally processing the changes and achieving synchronization independently is also desirable because it is more efficient then centralized systems, for example 2 computers synchronize peer-to-peer instead of synchronizing the changes through a server which is an additional computing device that increases the total number of computers to 3 and the changes traffic between the 3 computing devices is doubled. Locally processing the changes and achieving synchronization independently is also desirable because P2P synchronization networks may be considered more secured and private because the synchronized data needs to travel only between the allowed peers with no mediation through servers.

SUMMARY OF THE INVENTION

Some embodiments of the invention relate to a method and a system for enabling peer to peer synchronization between members of a synchronization network. According to some embodiments of the invention the peer to peer synchronization network may be implemented in respect of a predefined synchronization reference area on each member of the network. According to further embodiments of the invention, a common identifier that is substantially uniquely associated with the synchronization network may be providing to each member of the network. A change may be detected on a member of the synchronization network with respect to a data item that is associated with the synchronization network. A network identifier that is uniquely associated with the network with which the data item is associated may be obtained. A substantially unique identifier of a synchronization module on which the change in respect of the data item has been detected may also be obtained. The type of change in respect to the data item may be obtained. A relative path to the data item within the predefined synchronization reference area may also be obtained. A substantially unique value or values may be calculated based upon a content of a current and/or a previous version or versions of the data item that is associated with the change. A log number counter may be increment and the log number at the counter may be obtained. Next, a log representing the data item and the change implemented in respect of the data item may be created. The log may include data in respect of the type of change, the network identifier of the network with which the data item is associated, the substantially unique identifier of the synchronization module on which the change in respect of the data item has been detected, the relative path associated with the data item, the substantially unique value or values, and the log number at the counter. According to some embodiments of the invention, a member of the network that is in receipt of the log may be able to locally process the received log and thereby achieve synchronization with respect.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
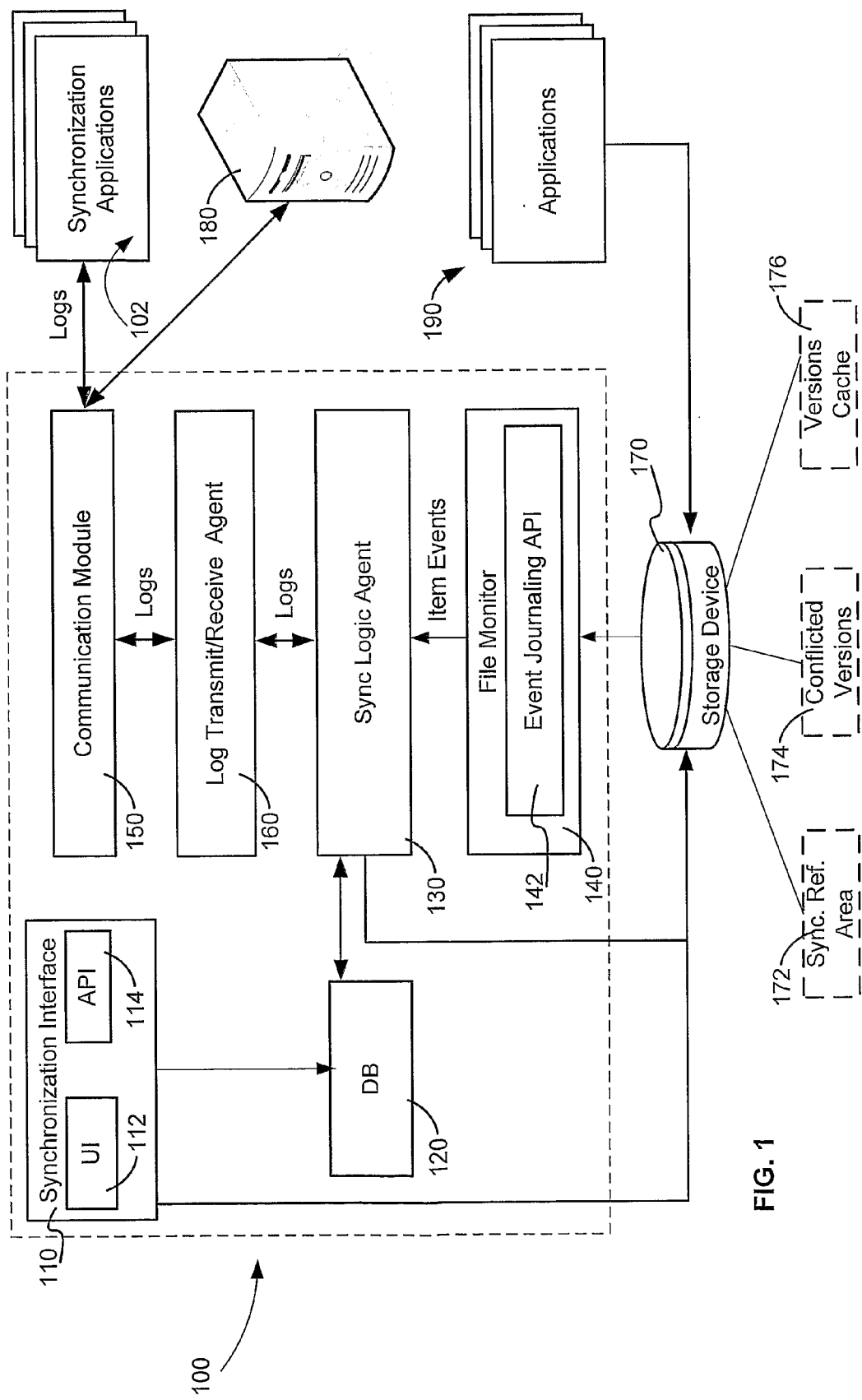
FIG. 1 is which is a high level block diagram illustration of a member of a peer to peer synchronization network and of associated entities, according to some embodiments of the invention.

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "assigning" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention relates to a system and a method of enabling peer to peer synchronization between members of a synchronization network. According to some embodiments of the invention, a root synchronization directory is defined on each member of the peer to peer synchronization network (also referred to herein as "P2P synchronization network"), and the synchronization network is implemented in respect of a predefined synchronization reference area that is defined by the root synchronization directory on each member of the network. In the proposed peer to peer synchronization network which may be enabled by a system and/or a method according to some embodiments of the invention, synchronization may be achievable through the exchange of synchronization logs. Each log may relate to a specific data item within a predefined synchronization reference area that is associated with a specific peer to peer synchronization network.

A synchronization log, according to some embodiments of the invention, may include data in respect of the following: a log number, a unique identifier of the network which includes the data item to which the log relates, the type of change that was applied to the data item to which the log relates, the relative path to the data item to which the log relates within the predefined synchronization area, a unique identifier of the synchronization module that created the log, a log number at the synchronization module that created the log, a unique value that is based upon the content of the current version and/or previous version(s) of the data item to which to log relates. As will be explained in further detail below, according to further embodiments of the invention, some logs, for example logs which relate to specific types of changes that were applied to the data item, may include additional data.

According to further embodiments of the invention, a member of a peer to peer synchronization network in receipt of a log may be able to locally process the received log, and the local processing of the received log may enable the member of the network in receipt of the log to become synchronized with one or more other members of the network with respect of the data item to which to log relates. According to still further embodiments of the invention, a member of a peer to peer synchronization network may be configured upon receiving a log, to determine whether it has already received the log, and in case it is determined that the log has already been received at this member of the peer to peer synchronization network, the may be dismissed.

Reference is now made to FIG. 1, which is a high level block diagram illustration of a member of a peer to peer synchronization network and of associated entities, according to some embodiments of the invention. According to some embodiments of the invention, a synchronization module 100 may include a synchronization interface 110, a database 120, synchronization logic agent 130, and a log transmit agent 160. The synchronization module 100 may further include or may be associated with a file monitor unit 140 and a communication module 150. According to further embodiments of the invention, the synchronization module 100 may be associated with a storage device 170, a synchronization service 180, applications 190 (also referred to herein as "third party applications") and with at least one other synchronization module 102.

According to some embodiments of the invention, the synchronization module 100 may be a member of a peer to peer synchronization network. For example, a peer to peer synchronization network may be established between synchronization module 100 and synchronization module 102. As part of setting up the peer to peer synchronization network, a root synchronization directory may be defined on each member of the peer to peer synchronization network. The root synchronization directory may be defined by a user or may be selected or created based upon some logic that may be implemented by the synchronization module whenever a new peer to peer synchronization network is set up. The synchronization root directory may define a synchronization reference area on each member of the synchronization network. The synchronization reference area may be uniquely associated with that peer to peer synchronization network. The peer to peer synchronization network may include two or more members and members may join the network dynamically. Each member joining the network may be required to undergo the network setup process described above.

Further as part of the synchronization module setup, according to some embodiments of the invention, a synchronization service 180, for example, may generate a substantially unique synchronization module identifier, for example, a global unique identifier (GUID) for each synchronization module 100. According to some embodiments of the invention, the unique identifier to any log that is created by it. The synchronization module 100, for example using the synchronization logic agent 130, may be configured to add the unique synchronization module identifier to each log it generates (in response to an event within synchronization reference area or in response to the implementation of another log). Similarly, the synchronization module 100 may be adapted to identify an incoming log as being associated with a certain synchronization module based upon the unique synchronization module identifier included within the synchronization log.

Further as part of the peer to peer synchronization network setup, a synchronization service 180 may generate a substantially unique network identifier, for example, a global unique identifier (GUID) and may transmit the substantially unique network identifier to each member of that peer to peer synchronization network. The receipt of the network identifier and the implementation thereof will be discussed in greater detail below. The unique network identifier may be received by each synchronization module 100 that is a member of the P2P synchronization network with which the identifier is uniquely associated. The synchronization module 100, for example using the synchronization logic agent 130, may be configured to add the unique network identifier to each outgoing log within the P2P synchronization network with which the identifier is uniquely associated. Similarly, the synchronization module 100 may be adapted to identify an incoming log as being associated with a certain P2P synchronization network based upon the unique network identifier included within the synchronization log.

As a member of a peer to peer synchronization network, synchronization module 100 may adapted to create a log in respect of a data item. A data item in the context of a peer to peer synchronization network according to the present invention is a data unit that is within the predefined synchronization reference area that is uniquely associated with the peer to peer synchronization network. The synchronization module 100 may be adapted to create a synchronization log in a manner to enable a other member of the network in receipt of the log to achieve synchronization with respect of the data item by only locally processing the received log.

According to further embodiments of the invention, as a member of a peer to peer synchronization network, synchronization module 100 may adapted to receive a synchronization log from a other member of the network and may be adapted to implement the log. According to some embodiments of the invention, the synchronization module 100 may be adapted to achieve synchronization with respect to the data item through local processing of the received log and no subsequent data exchanges may be required following the exchange of the log and as part of the processing of the log in order to achieve synchronization with respect to the data item.

The term "locally processing the logs" as used herein with reference to a member of a peer to peer network means that the synchronization module 100 of the member of the network may process a received log without being advised by any other software including but not limited to the synchronization service 180 and any of the other synchronization applications 102 further to the data contained in the log itself. It would be appreciated that in accordance with current synchronization schemes, such as synchronization schemes based on master slave relations, where one application is controlling or telling the other application what to do in order to achieve synchronization, or a centralized synchronization systems, where the centralized server is actually the master for synchronization, as another example, local processing of a log is not sufficient to achieve synchronization with respect to a data item to which to log relates.

It would be appreciated that enabling local processing of synchronization logs to achieve synchronization independently in respect of a data item to which the log relates is desirable in a P2P network, particularly were the number of members of the P2P synchronization network may be unlimited and some of the members may not be constantly online (24/7). Furthermore, local processing of synchronization logs to achieve synchronization independently is also desirable because it may provide some advantages in terms of overall efficiency when compared with a centralized synchronization solution. For example, two computers which are members of a common P2P synchronization network may communicate with one another (peer-to-peer) in order to achieve synchronization with respect to a data item instead of synchronizing through a server which is an additional computing device an may increase the total the traffic that is required by the synchronization process. A centralized server that can process millions of synchronization activities per second also increases the overall cost of the synchronization network. This and more, locally processing the logs and achieving synchronization independently also means that logs can be relayed between the online peers and achieve synchronization even when some of the peers are offline. The triggering of a synchronization log creation process and the process of creating a synchronization log shall be discussed in greater detail below.

Having described in general some aspects of a synchronization module 100 that is a member of a peer to peer synchronization network according to some embodiments of the invention, there is now provided a description of one example of a synchronization module 100 implementation that is illustrated by FIG. 1. As part of describing the example of the synchronization module 100 implementation, reference is made to various internal and external entities which are included as part of the synchronization module 100 or which are associated with the synchronization module 100. It would be appreciated that the specific organization of the various internal and external entities shown in FIG. 1 and described herein with reference to the implementation of the synchronization module 100 shown in FIG. 1 is provided for illustration purposes only, and that a synchronization module 100 according to further embodiments of the invention may be otherwise implemented.

In accordance with some embodiments of the invention, a storage device 170 may be associated with the synchronization module 100. The storage device 170 may be used to store data units thereon. Each P2P synchronization network may include data unit which are to be synchronized across the members of the network. Each data item of a P2P synchronization network may be associated with one or more data units which are stored on a storage device 170 of a synchronization module 100 that is a member of the P2P synchronization network. According to some embodiments of the invention, a storage device 170 may be used to store data units that are associated with different P2P synchronization networks.

The synchronization module 100 may further include a file monitor module 140 for monitoring activity on the storage device 170. The file monitor module 140 may be adapted to monitor actions or events occurring with respect to data units that are stored on the storage device 170. It would be appreciated that actions or event may occur with respect to data units as a result of an interaction with the synchronization module 100 (including interaction with a user through the synchronization module 100) or as a result of an interaction with any other application 190 or hardware device that may have access to the storage 170. Some examples of interactions which result in actions or events occurring with respect to data units that are stored on the storage device 170 are provided below.

As mentioned above, according to some embodiments of the invention, when a synchronization module 100 becomes a member of a P2P synchronization network, a root synchronization directory may be defined on the storage device 170 based upon a relative directory scheme implemented on the storage device 170, for example, by a file system that is used to manage the storage device 170. The root synchronization directory may be defined, for example, by the synchronization logic agent 130. The synchronization logic agent 130 may record data in respect of the root synchronization directory of the P2P synchronization network together with other basic setup data of the P2P synchronization network within a synchronization data base 120. The recording of the setup data will be discussed in greater detail below.

According to some embodiments of the invention, the synchronization root directory of a certain P2P synchronization network may define a certain synchronization reference area 172. For example, according to some embodiments of the invention, a synchronization reference area 172 of a certain P2P synchronization network may be defined as the area on the storage device 170, or as the area of the file system implemented on the storage device 170, that is under (or lower down the hierarchy than) the synchronization root directory that was defined for that P2P synchronization network. Accordingly, a P2P synchronization network may be defined in respect of data units within the synchronization reference area 172 that is associated with that network.

In accordance with some embodiments of the invention, the file monitor 140 may be adapted to monitor actions in respect of a data unit that is associated with a P2P synchronization network that the synchronization module is a member of. As will be explained in greater detail below, a P2P synchronization network may be implemented in respect of data units within the synchronization reference area 172. The file monitor 140 may be configured to report the events that occurred within the synchronization reference area 172 to the synchronization logic agent 130.

According to some embodiments of the invention, the synchronization logic agent 130 may be configured to listen to event notifications generated by the file monitor 140. In some embodiments of the invention the, synchronization logic agent 130 may be configured to receive event notifications from the file monitor 140 in response to a creation of a new data unit within the synchronization reference area 172. In according with further embodiments of the invention, the synchronization logic agent 130 may be adapted to create a new P2P synchronization network data item that is associated with the newly created data unit in response to the creation of the new data unit, as will be described in further detail below. In accordance with yet further embodiments of the invention, a data item may include information with respect to the data unit, such as the network identifier of the P2P synchronization network to which the data unit belongs, the relative path to the data unit and a substantially unique value calculated based upon the content of the data unit. It would be appreciated that the data item may, at least in some cases, include further data in respect of a data unit that is associated with the P2P synchronization network.

According to some embodiments of the invention, the synchronization logic agent 130 may also create a version for an existing data item of a P2P synchronization network. In accordance with further embodiments of the invention, a data item may have more than one version associated with it, and each version that is associated with a certain data item may correspond to a different data unit on the storage device 170. In accordance with yet further embodiments of the invention, some of the versions may be associated with data units stored in the conflicted versions 174 or the cached versions 176 repositories. Conflicting versions and cached versions will be discussed in greater detail below. According to some embodiments of the invention the synchronization logic agent 130 may be configured to store data in respect of each data item of a P2P synchronization network that the synchronization logic agent 130 is member of on a database 120, including data in respect of each existing version of the data item.

It would be appreciated that according to some embodiments of the invention, for each data item that is associated with a P2P synchronization network there is a data unit stored within the synchronization reference area 172 (in some cases a data item may be created before the process of storing the data unit within the synchronization reference area 172 is complete). It would also be appreciated, that in accordance with further embodiments of the invention, if there is more than one version of a certain data item, there will be at least one data unit that is associated with a version of the data item within the synchronization reference area, and each other version may be associated with a different data unit which may be located within the synchronization reference area 172 or may be located at some other location outside the synchronization reference area 172, for example, with a conflicted versions 174 area. The synchronization logic agent 130 may record in a database data in respect of each version of a data item, and may use the data in the database to refer to and locate each version of a data item, as necessary.

According to some embodiments of the invention, the synchronization logic agent 130 may be configured to generate one or more synchronization logs in response in to an event notification from the file monitor 140 that is associated with a data item of a P2P synchronization network that the synchronization agent logic 130 is a member of. The creation of synchronization logs and the implementation of synchronization logs in accordance with some embodiments of the invention will be described in further below. In accordance with some embodiments of the invention, the synchronization logic agent 130 may include in each log certain data which is required to enable a other member of the P2P synchronization network to achieve synchronization with respect to a data item by locally processing the log. The synchronization logic agent 130 may include in each log the following data: a log number, a substantially unique network identifier of the P2P synchronization network with which the log is associated, the relative path to a data unit that is associated with the data item to which the log relates (defined by the synchronization root directory of the P2P synchronization network with which the log is associated), a synchronization module identifier, a log number at the synchronization module that created the log The log number at the synchronization module that created the log is assigned upon log creation and it is identical to the log number field, however when a this log is processed and as a result of the process a data item may be changed a new log carrying the local log number will be created carrying the original 1) synchronization module identifier and, 2) processed log number at the synchronization module that created the log] a value that is based upon the content of a data unit that is associated with a data item to which the log relates, and possibly a list of one or more additional values, each value being based upon a content of a data unit which is, within the context of the P2P synchronization network, regarded as a version the data item to which the log relates. According to some embodiments of the invention, the synchronization logic agent 130 may be configured to store the logs in the database 120.

As mentioned above, each synchronization log may include a log number. The synchronization logic agent 130 may generate ascending numbers and may assign them to logs by the order by which the logs have been created, thereby providing an indication with respect to the order by which logs have been created. In case the synchronization logic agent 130 handles two or more P2P synchronization networks, it may be adapted to generate the ascending numbers with respect to each network, separately. Thus, the ascending order may be maintained across the two or more P2P synchronization networks that the synchronization logic agent 130 is handling. In order to keep track of the numbers assigned to logs, the synchronization logic agent 130 may implement a log number counter. It would be appreciated that a synchronization logic agent 130 may be used to manage a plurality of peer to peer synchronization networks it may hold a different counter for each network so that the ascending order of the logs in maintained for each peer to peer synchronization network in separate. The log number counter may be incremented every time the synchronization logic module 130 generates a new log (in response to an event within synchronization reference area or in response to the implementation of another log). The value of the log number associated with the new synchronization log generated by the synchronization logic module 130 may be equal to the log number counter. The synchronization logic agent 130 may store the log number counter in the database 120 with reference to the P2P synchronization network to which the log belongs.

As mentioned above, each synchronization log may include a log number which corresponds to the log number at the member of the P2P synchronization network which generated the log. It would be appreciated, that according to some embodiments of the invention, the inclusion of the log number within a synchronization log may enable a synchronization module that is in receipt of a log to keep the order of logs implementation. When logs are generated the log number is increased with every log created. When logs are implemented by the synchronization logic agent 130, they are implemented in the order of creation. Thus, if for example, a certain log that is received at a certain member of a P2P synchronization network from a other member of the network has a log number that is smaller than the recorded log number for that member, the member of the P2P synchronization network may identify that the received log has already been implemented on it and may ignore this log. This scenario may occur, for example, _____

According to some embodiments of the invention the synchronization logic agent 130 may hold a received log number counter with reference to each member of a P2P synchronization network that it is connected to either directly or through a third member of a common P2P synchronization network. The record on a member of a P2P synchronization network which includes a log number counter in reference to another member of a P2P synchronization network may represent the highest log number received directly or indirectly from that other member of the P2P synchronization network.

As mentioned above, a member of a P2P synchronization network may record the highest log number counter that was received directly or indirectly from each other member of the network from which it received logs directly or indirectly. According to some embodiments of the invention, a synchronization log within a P2P network may include in addition to a log number at a member of the network which created the log, a log number at a member of the network which forwarded the log to its current recipient (a third member of the network). For example, in a P2P synchronization network that includes three or more members, a synchronization log may be created at a first member of the network, for example, in response to an event occurring with respect to a data unit within a predefined synchronization reference area that is associated with that network. The log, together with the log number at the first member of the P2P synchronization network (the creator of the log) may be forwarded to a second member of the P2P synchronization network. The second member of the P2P synchronization network may implement the log, and as a result may locally create its own log (or logs), for example since the implementation of the log received from the first member of the network an event with respect to a data unit within a predefined synchronization reference area that is associated with that network. When a third member of the P2P synchronization network synchronizes with the second member of the network, and it assumed for illustration purposes that the first member is offline, the second member of the network may provide the third member of the network with the log which was created at the second member of the network in response to the log received from the first member of the network. According to some embodiments of the invention, this log may have two log number, the first log number being the log number at the member of the network which created the log that caused the received log to be created, and the second log number being the log number at the second member of the network which created the received log in response to the log received from the first member of the network.

It should be appreciated that a synchronization logic agent 130 may hold a plurality of received log number counters, each corresponding to a different member of the P2P synchronization network (in case there are a plurality of members). Also according to further embodiments of the invention, a synchronization logic agent 130 may be associated with more than one P2P synchronization network and may hold received log number counters for members of each of the different synchronization networks with which it is associated.

According to some embodiments of the invention, when a synchronization logic agent 130 requests a log (or logs) from a other member of the P2P synchronization network it may include in the request its record with respect to the log number counter that is associated with that member of the P2P synchronization network. By including in the log request the member's record with respect the log number counter associated with the member of the P2P synchronization network towards which the request is directed, the requesting synchronization module 100 may inform the member of the network in receipt of the request what is the highest log number that the requesting synchronization module has received so far from the recipient of the request. In response to the request, and based upon the log number counter included in the request, a member of the P2P synchronization network that is in receipt of the request, may return the requesting member the available logs (in ascending order) at the member in receipt of the request, whose log number is greater than the log number counter included in the request. Following a receipt of log(s) from a member of a P2P synchronization network, the synchronization logic agent 130 at the member of the network in receipt of the logs may increment the received log number counter that is associated with the member of the P2P synchronization network from which the logs were received. The synchronization logic agent 130 may store the received log number counter(s) associated with a member of the P2P synchronization network in the database 120.

In some embodiments of the present invention, if during the processing of a received log the synchronization logic agent 130 determines that the received log number is not greater than the log number counter associated synchronization module 100, the synchronization logic agent 130 of synchronization module 100 may dismiss the log. For example, a member of a P2P synchronization network may become online and upon becoming online a peer to peer synchronization process may commence with two (or more) other members of the network. During the simultaneous synchronization with the other two members of the network, a first and a second member, by the time that one request for logs vis-à-vis, for example, the first member of the network is complete with a certain log number received, the log counter for that member (the first member) at the receiving member of the network may already be incremented as a result of processing the logs already received from the second member of the network. It would be appreciated, that as was discussed above, a log from the second member of the network may include in addition to the log number of the second member of the network, a log number at the first member of the network with which the log is associated (for example, the log at the second member of the network may have been created as a result of implementing a log with this log number received from the first member of the network).

As mentioned above, in accordance with some embodiments of the invention, a synchronization module identifier may be used for specifying, within log, which member of a P2P synchronization network is the source (the origin) of the log. According to further embodiments of the invention, the synchronization module identifier may specifically refer to the synchronization module (for example, 100 or 102) which created the log created the log. The synchronization module identifier may also be used during the processing of a log as part of implementing the log. The synchronization module identifier may also be used after implementing a log for determining which synchronization module created the log so that the received log number counter(s) associated with that synchronization application (or with the member of the network that is associated with that synchronization application) can be incremented.

According to some embodiments of the invention each synchronization log may include a synchronization module identifier. The synchronization logic agent 130 may assign its synchronization module identifier to logs it creates in connection with a certain P2P synchronization network (in response to an event within synchronization reference area or in response to the implementation of another log).

According to some embodiments of the invention, the synchronization logic agent 130 of synchronization module 100 may process a log received from a other synchronization module 102 and use the synchronization module identifier included as part of a received log to determine weather to process the log or not. In accordance with some embodiments of the invention, the synchronization logic agent 130 of synchronization module 100 may determine if the synchronization module identifier stored within the received log is identical to the synchronization module identifier of the synchronization module 100 that is processing the received log. In case it is determined during the processing of a log, that the synchronization module identifier stored within the received log is identical to the synchronization module identifier of the synchronization module 100 that is processing the received log, the log may be dismissed. It would be appreciated that in case a synchronization module identifier stored within a received log is identical to a synchronization module identifier of the synchronization module that is processing the received log, the log is already implemented on the synchronization module that received the log. The received log number counter associated with synchronization module 102 will be incremented, so that the next time the synchronization module 100 requests synchronization logs from that member of the P2P synchronization network it does not received the log which has been dismissed.

According to some embodiments of the invention, the synchronization logic agent 130 of synchronization module 100 may determine if the synchronization module identifier stored as part of a received log is identical to the synchronization module identifier of the synchronization module that sent the received log. In case it is determined that the synchronization module identifier in a received log is identical to the synchronization module identifier of the synchronization module that sent the received log, the log may be processed. Additionally, the received log number counter associated with the synchronization module which sent the received log, or with a member of the network that is associated with the synchronization module which sent the received log, may be incremented as well. It would be appreciated, that if as a result of processing a received log a new log is created at the member of the network in receipt of the log, the local log number counter at the receiving member of the network may be incremented. However, it should also be appreciated, that in response to receiving a log from another member of a P2P network a new log at the recipient may or may not be required.

According to some embodiments of the invention, the synchronization logic agent 130 of synchronization module 100 may determine if the synchronization module identifier within a received log is not identical to the synchronization module identifier of the synchronization module 102 that is the sender of the log and is also not identical to the synchronization module identifier of the synchronization module 100 that is processing the received log. It would be appreciated that the above scenario may occur when a received log was created by a third member of the P2P synchronization network (not the sender nor the recipient). When the synchronization module identifier within a received log is associated with a third member of the P2P synchronization network (not the sender nor the recipient), the log may be processed by the synchronization logic agent 130 of the receiving synchronization module 100, and the receiving synchronization module may increment each of: the received log counter number associated with the member of the network from which the log was received, and the received log number counter associated with the third member of the P2P synchronization network (the creator of the log).

As mentioned above, according to some embodiments of the invention, the database 120 may store data items, versions, and logs associated with a data of P2P synchronization network that the synchronization module 100 is a member of. In accordance with some embodiments of the invention, the database 120 may include additional metadata information associated with and in respect of a data item. The additional metadata may include, for example, the data unit's synchronization status, or read/unread indication, and the versions inter-relations. The metadata stored in connection with a data item may include other types of data. For convenience, the additional data beyond that which is necessary for enabling the peer to peer synchronization according to some embodiments of the invention, shall be collectively referred to herein as "metadata". In other embodiments of the present invention the Database 120 may also hold additional metadata information enabling the Synchronization module 100 to effectively synchronize the Data Units across synchronization networks.

According to some embodiments of the present invention the synchronization logic agent 130 may be configured to process an authentication and authorization process with the synchronization service 180, for example, using the communication module 150 for establishing and conducting a communication session with the synchronization service 180. In according with further embodiments of the invention, the synchronization service 180 may be configured to look for online synchronization modules 100 and 102 that share the same unique network identifier. In some embodiments of the invention, the synchronization service 180 may ask two or more synchronization modules 100 and 102 that share the same unique network identifier to establish a peer-to-peer communication therebetween. Thus, a peer to peer synchronization network may be established between synchronization modules 100 and 102.

According to some embodiments of the invention, the log receive\transmit agent 160 may be configured to receive a request from a member of a peer to peer synchronization network through the communication module 150 to send the logs with log number greater than the number received in the request.

According to some embodiments of the present invention the synchronization logic agent 130 may receive a request from the log receive\transmit agent 160 to send the logs with log number greater than the number received in the request. In some embodiments of the invention, the synchronization logic agent 130 may be configured to query the database 120 in response to a request to provide the logs with log number greater than the number provided in the log and in response, the database 120 may provide the synchronization logic agent 130 with the logs list containing logs with log number greater than the number provided in the request in ascending order. In some embodiments of the invention the synchronization logic agent 130 may be configured to generate a response with the logs list in ascending order, containing logs with log number greater than the number provided in the request and may provide the response to the log receive\transmit agent 160 for transmission to the member of the P2P synchronization network which generated the request.

According to some embodiments of the invention, as part of synchronizing with a member of a P2P synchronization network, a synchronization logic agent 130 associated with a first member of the network may request its log receive\transmit agent 160 to request another member (a second member) of the network (with which synchronization is sought) for data in respect any new logs generated by that member (the second member) which have been generated since the last synchronization session with that member of the network. According to some embodiments of the invention, within a P2P synchronization a member (a first member) of the network may request another member of the network (a second member) to send as part of a synchronization process with that other member, only logs that the other member generated himself. However, it would be appreciated that since, according to some embodiments of the invention, the logs of a certain member of the network (a second member) may have been created as a result of implementing logs from a third member of the network, the logs received (at a first member) from that member of the network (the second member) may also include data in respect of the logs of the third member of the network with which they are associated. In accordance with further embodiments of the invention, the log receive/transmit agent 160 may forward the logs received from a other member of the peer to peer synchronization network to the synchronization logic agent 130, and the synchronization logic agent 130 may process the received logs. In accordance with yet further embodiments of the invention, the synchronization logic agent 130 may store the received logs in the Database 120.

In accordance with some embodiments of the invention, the synchronization logic agent 130 may process the retrieved logs and may insert, update or delete new data units within the synchronization reference area 172 that is associated with the P2P synchronization network to which the received logs belong. In accordance with further embodiments of the invention, the synchronization logic agent 130 may process the retrieved logs and as a result of processing the logs, the synchronization logic agent 130 may cause data items, versions, and/or other metadata related to a data unit to be modified on the database 120. In accordance with still further embodiments of the invention, the synchronization logic agent 130 may process retrieved logs and may insert into, or delete data units from the conflicted version storage area 174. In according with still further embodiments of the invention, the synchronization logic agent 130 may process the retrieved logs and may move a new data unit to the versions cache 176. In accordance with yet further embodiments of the invention, the synchronization logic agent 130 may process the retrieved logs and may create new logs and store them in the database 120. Examples of criteria which may be implemented by the synchronization logic agent 130 to determine which of the above actions to implement and under which circumstances shall be described below.

In some embodiments of the present invention the synchronization logic agent 130 of synchronization module 100 may process the received logs and may create new logs that are created as a result of implementing the received log. The new logs which have been created as a result of implementing the received logs, may have different values in the log number field and log number in field which relates to the synchronization module that created the log. When the synchronization logic agent 130 of synchronization module 100 creates a new log as a result of implementing a received log, that new logs will have a new log number associated with the counter of the synchronization module 100 that is implementing the received log. However, it would be appreciated that according to some embodiments of the invention, the synchronization module identifier of the member of the network which created the log (that is being implemented) and the log number at the synchronization module that created the log will be copied from the received log to the new log created at the member of the network which is implementing the log. For example, when a log such as the one mentioned above is received and processed by a member of the P2P synchronization network that joined this networks, the joining member of the network may relate to such a log as a third party log, since this log was not created by the log receiver or the log sender.

In accordance to some embodiments of the present invention the synchronization logic agent (FIG. 1 block 130) may receive Events from the file monitor (FIG. 1 block 140) associated with folders. It should be further noted that in accordance to some embodiments of the present invention the synchronization logic agent (FIG. 1 block 130) may generate logs in response to events associated with folders. In some embodiments of the present invention logs on folder may be generated by the synchronization logic agent (FIG. 1 block 130) and stored in the database (FIG. 1 block 120). In other embodiments of the present invention an insert log for a folder may be generated by the synchronization logic agent (FIG. 1 block 130) in response to an insert event on a folder from the file monitor (FIG. 1 block 140). In some embodiments of the present invention a delete log for a folder may be generated by the synchronization logic agent (FIG. 1 block 130) in response to a delete event on a folder from the file monitor (FIG. 1 block 140). In other embodiments of the present invention delete log followed by an insert log for a folder may be generated by the synchronization logic Agent (FIG. 1 block 130) in response to a rename event on a folder from the File Monitor (FIG. 1 block 140). It should also be noted that in some embodiments of the present invention the synchronization logic agent (FIG. 1 block 130) may process an Insert log and may create a folder on the storage device (FIG. 1 block 170). In some embodiment of the present invention when the synchronization logic agent (FIG. 1 block 130) process a delete Folder log the synchronization agent may generate delete events and corresponding logs to all files and sub folders associated with the delete folder log. As will be explained in further detail below, according to further embodiments of the invention folders may be inserted or deleted on the storage device.

Figure 6:
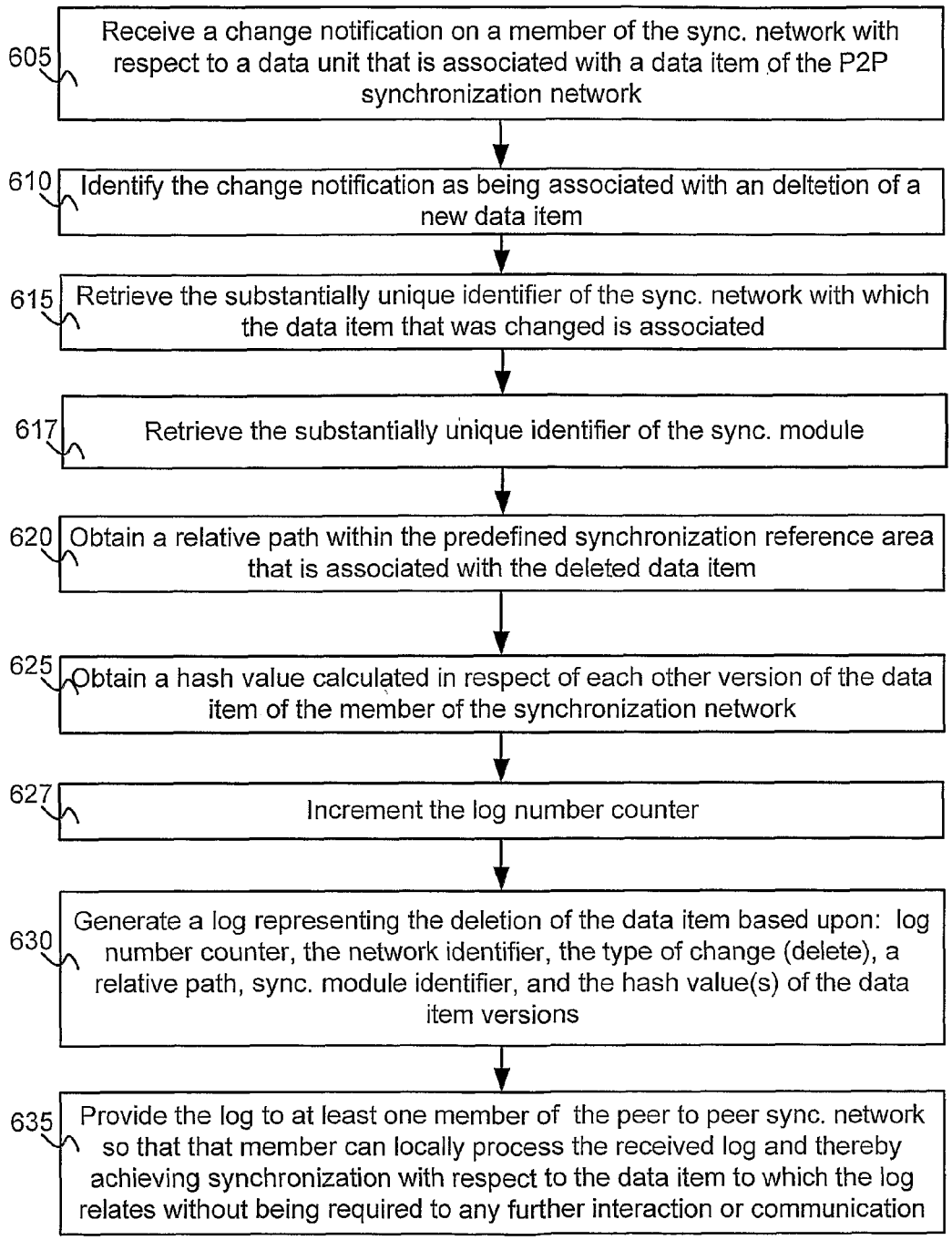
FIG. 6 is a flowchart diagram of a process of creating a synchronization log in response to receiving a change notification that is identified as being associated with a deletion of a data item which was previously part of the P2P synchronization network, according to some embodiments of the invention.
Figure 11:
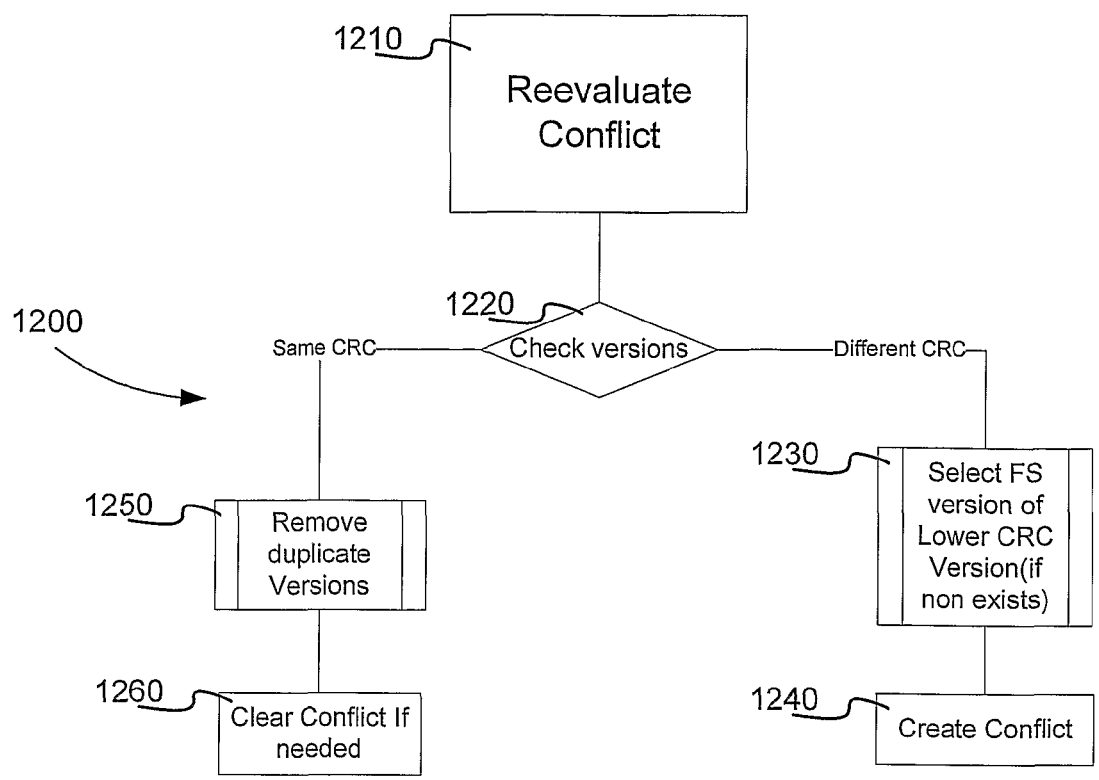
FIG. 11 is block diagram made for convenience and illustration purposes, illustrating various components of the reevaluate conflict operation, in accordance with some embodiments of the invention.

In some embodiments of the present invention after the Synchronization Logic Agent (Block 130 FIG. 1) implement the Update operation FIG. 6 the Synchronization Logic Agent (Block 130 FIG. 1) may perform a reevaluate conflict operation FIG. 11. It should also be noted that in some embodiments of the present invention after the Synchronization Logic Agent (Block 130 FIG. 1) implement the Delete operation FIG. 7 the Synchronization Logic Agent (Block 130 FIG. 1) may also perform a reevaluate conflict operation FIG. 11. As will be explained in further detail below, according to further embodiments of the invention conflicts may rise or resolved when applying the reevaluate conflict operation.

In some embodiments of the present invention the Synchronization Logic Agent (Block 130 FIG. 1) may check if the data items stored in the Database (Block 120 FIG. 1) and associated a Data Unit on the Synchronization Reference Area (Block 172 FIG. 1) of a Storage Device (Block 170 FIG. 1) is correct, this process may be referred as Verify(FS) 1400. In other embodiments of the present invention Verify(FS) 1410 will be processed for a data items entry before processing an Insert operation FIG. 8 on the data item of the Data Unit. In some embodiments of the present invention Verify (FS) 1410 will be processed for a data item entry before processing an update operation FIG. 8 on the data item of the Data Unit. In other embodiments of the present invention Verify(FS) 1410 will be processed for a data item entry before processing a Delete operation FIG. 9 on the data item of the Data Unit. As will be explained hi further detail below, according to further embodiments of the invention Verify(FS) may update the data item values associated with a data unit to reflect its current status in the system.

In some embodiments of the present invention when the Synchronization Logic Agent (Block 130 FIG. 1) processes logs related to a data unit it may verify before creating a new insert log that there are no previous versions of a Data Unit on a Synchronization Reference Area (Block 172 FIG. 1) of a Storage Device (Block 170 FIG. 1) that has no data item representation in the Database (Block 120 FIG. 1). As will be explained in further detail below, according to further embodiments of the invention Sync(FS) may update the data item values associated with a data unit to reflect its current status in the system.

In some embodiments of the present invention when the Synchronization Logic Agent (Block 130 FIG. 1) is processing a Rename or Move operation of a data unit the result of such operations may be a delete operation and log for the older name or location followed by an insert operation and log for the new data unit name or location. It should also be noted that in some embodiments of the present invention the delete and insert logs are separate operations and the synchronization logic agent (Block 130 FIG. 1) is not aware that the delete and insert operations are associated and that together they represent a move or rename operation. It should also be further noted that in some embodiments of the present invention the lack of connection between the delete and insert operation associated with move or rename operations may result redundant traffic for move and rename operations since once a delete log is implemented its corresponding Data Units may be deleted and may not exist on the storage device anymore (Block 170 FIG. 1) and when the corresponding insert log representing the new name or at the new location is processed the corresponding data units may needs to be retransmitted from a different synchronization application (Block 100 FIG. 1). According to further embodiments of the invention a version caching algorithm may be processed minimizing the redundant retransmission of data units in response to move and rename operations In accordance with some embodiments of the present invention the synchronization interface 110 may include an application program interface 114 (hereinafter: "API") and a user interface 112 (hereinafter: "UI"). In some embodiments of the invention, the UI 112 may use the API 114 to send or request information from other entities of the synchronization module 100. In accordance with further embodiments of the invention, applications 190, for example third party applications, may use the API 114 to send or request information from the synchronization module 100 and/or from specific entities of the synchronization module.

In accordance with some embodiments of the invention, the synchronization interface 110 may be adapted to enable, for example a user or a third part application 190, to read or manipulate data units that are stored on a storage device 170 that is associated with the synchronization module 100. In other embodiments of the present invention the synchronization interface 110 may enable a user or an application to create new data units on the storage device 170. The synchronization interface may also enable to browse the data units stored within the storage 170. Various aspects of the storage device 170 and the interaction between the synchronization module 100 and the storage device 170 shall be discussed below.

For convince and illustration purposes, in FIG. 1 and in accordance with some embodiments of the invention, file monitor unit 140 and communication module 150 are shown as being an integral part of the synchronization module 100. However, it would be appreciated that the file monitor unit 140 and/or the communication module 150, as well as any other unit or module in the synchronization system may be otherwise implemented and existing components or modules may be used augmented or not for implementing some aspects of some embodiments of the present invention.

Figure 2:
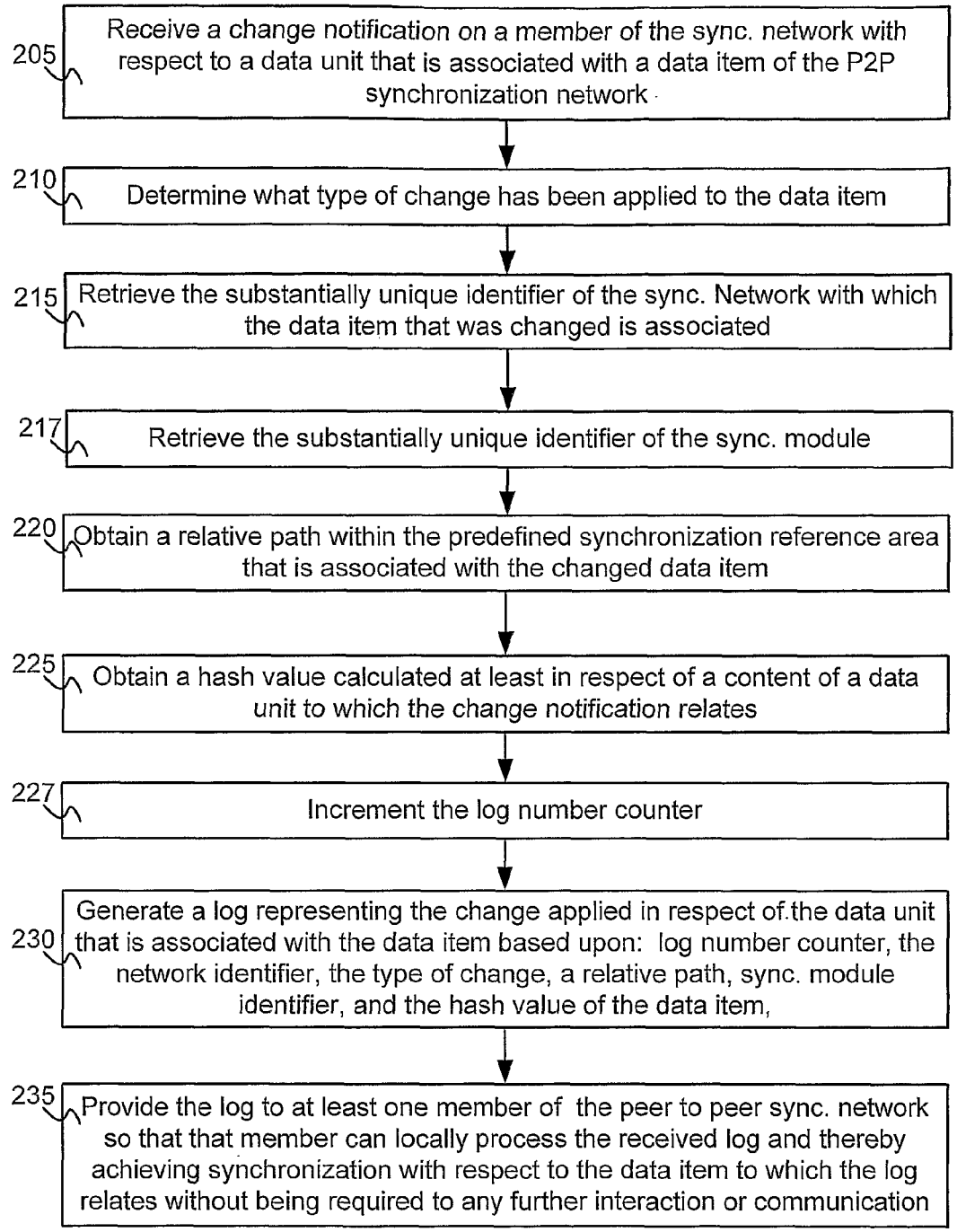
FIG. 2 is a flowchart diagram of a general process of creating a synchronization log according to some embodiments of the invention.

Reference is now made to FIG. 2, which is a flowchart diagram of a general process of creating a synchronization log according to some embodiments of the invention. According to some embodiments of the invention, a change notification may be received on a member of a P2P synchronization network with respect to a unit that is associated with a data item of the P2P synchronization network (block 205). As mentioned above a data item of a P2P synchronization network is associated with a data unit that is stored within a predefined synchronization reference area that is associated with the P2P synchronization network.

The change notification received at block 210 may trigger a process of determining which type of change is associated with the notification. As was mentioned above, a file monitor may detect certain actions or events with respect to a data unit that is associated with a data item of a P2P synchronization network and may notify a synchronization logic agent about the action or event. Upon receiving the notification, the synchronization logic agent may initiate a process to determine what type of change has been applied to the data item (block 210). The process of determining what type of change has been applied to the data item may be required since actions or events reported by the file monitor may not always accurately represent changes in the context of a data item of a P2P synchronization network. A more detailed description of a process of determining what type of change has been applied to the data item and an example of a scenario where a notification by a file monitor does not accurately represent changes in the context of a data item of a P2P synchronization network shall be provided below.

Next, providing that the process of determining what type of change has been applied to the data item was concluded with a conclusion that some type of change has indeed occurred with respect to a data item within a P2P synchronization network, the substantially unique identifier of the P2P synchronization network with which the data item that was changed is associated may be retrieved (block 215). As mentioned above, on each member of a P2P synchronization network, there is defined a synchronization reference area that is uniquely associated with that P2P synchronization network. When a change is detected on a member of a P2P synchronization network (and determined to be an actual change in the context of the P2P synchronization network) with respect to a data unit that is stored within the predefined synchronization reference area, the unique identifier of the P2P synchronization network that is associated with the synchronization reference area within which the data unit is stored may be retrieved. It would be appreciated that on a certain computer or computers managed by a synchronization module according to some embodiments of the invention, a plurality (two or more) of P2P synchronization reference areas may be defined, and each P2P synchronization network may be associated with a different synchronization reference area on the computer or computers managed by the common synchronization module. More details in respect of a scenario where a synchronization module is associated with a plurality of P2P synchronization network shall be provided below.

Additionally, the synchronization module identifier associated with the member of the P2P synchronization network which is creating the log may also be obtained (block 217). It would be appreciated that each synchronization module identifier may be associated with only one member of the P2P synchronization network, and therefore providing the identifier of a synchronization module that is associated with a certain P2P synchronization network may be equivalent to an identifier of the member of the network.

In addition to the substantially unique identifier of the P2P synchronization network, a relative path within the predefined synchronization reference area that is associated with the changed data item may be obtained (block 220). The relative path is the path from the synchronization root directory which has been defined for a P2P synchronization network to a data unit that is associated with the changed data item. It would be appreciated that each data item is associated with one unique relative path within a predefined synchronization reference area that is associated with the P2P synchronization network to which the data item belongs. The relative path that is associated with the data item may point to a data unit within the predefined synchronization reference area that is associated with the data item. When a change is detected (and determined) in respect of a data item, the relative path to the data unit data unit within the predefined synchronization reference area that is associated with the data item may be provided and may identify the data item. The data item may be associated with additional data units (versions of the data item) which may or may not be stored within the predefined synchronization reference area. A reference to a data item within the context of a log is provided by the relative path described above, whereas a reference to a specific version of the data item is provided by a value which represents the content of a data unit that is associated with a specific version of the data item. Further aspects of the value which represents the content of a data unit which provides a reference to a specific version of a data item shall be discussed below.

This relative path to the data unit which has been changed may typically be part of a change notification received from the file monitor. However, if necessary the relative path to the data item may also be requested by the synchronization logic agent from the file monitor or from a file system associated with a storage device on which the data unit is stored.

Next, a hash value may be calculated based upon a content of a data unit to which the change notification relates may be obtained (block 225). A hash value is used here as an example of a value which may be calculated based upon the content of a data unit and which may represent the content of the data unit. Hash functions and other functions which may be used to calculate a value based upon the content of a data unit such that the value represents the content of the data unit are well known and may be used as part of some embodiments of the invention.

According to some embodiments of the invention, as part of generating a log (or immediately thereafter), a log counter may be incremented giving rise to an incremented log counter number (block 227).

Next, a synchronization log which represents that change applied in respect of the data unit that is associated with the data item of the P2P synchronization network may be created. Each synchronization log in a P2P synchronization network according to some embodiments of the invention may include each of the following: a log number counter, the network identifier which is uniquely associated with the P2P synchronization network with which the data item is associated, the type of change that was applied to the data item with which the log is associated, the ID of the member of the P2P synchronization network which is generating the synchronization log, the relative path that is associated with the changed data item, and the hash value that is based upon the content of the changed data unit to which log relates (block 230). It would be appreciated, that in accordance with further embodiments of the invention and under certain circumstances, a synchronization log may further include a second log number. For example, when a log is being created on a first member of a P2P synchronization network as a result of implementing a log received at the first member of the network from a second member of the network, the first member of the network may include in the log that is created as a result of the implementation of the log from the second member of the network, the log number of the log from the second member of the network which caused the present log on the first member of the network to be created. It would be further, that in accordance with yet further embodiments of the invention and under certain circumstances, a synchronization log may further include one or more additional value(s) that is\are based upon the content of additional version(s) of a data item with which the changed data unit is associated. Examples of such scenarios, shall be provided below.

Once the synchronization log is created, the log may be forwarded to at least one other member of the P2P synchronization network. According to some embodiments of the invention, the synchronization log transmitted out of the member of the P2P synchronization network may enable another member that is in receipt of the synchronization log to locally process the received log and to achieve synchronization with respect to the data item to which the log relates without being required to any further interaction or communication (block 235). Thus, according to some embodiments of the invention, the synchronization log may include all the data that is required by a member of the P2P synchronization network to become synchronized with respect to the data item.

It would be appreciated that the log to which the process illustrated by FIG. 2 relates is a general log and that according to some embodiments of the invention some specific type of logs may include other data in addition to the data that is described in FIG. 2 as being part of a synchronization log. An example of a process of determining which type of synchronization log is to be created in respect to an event notification from the file monitor 140 shall be provided below, followed by a detailed description of a process of creating each type of synchronization log including a description of what data should be included in each type of synchronization log, for the synchronization log to enable a member of a P2P synchronization network in receipt of the log to become synchronized in respect of a data item to which the log relates by only local processing of the received log.

Figure 3:
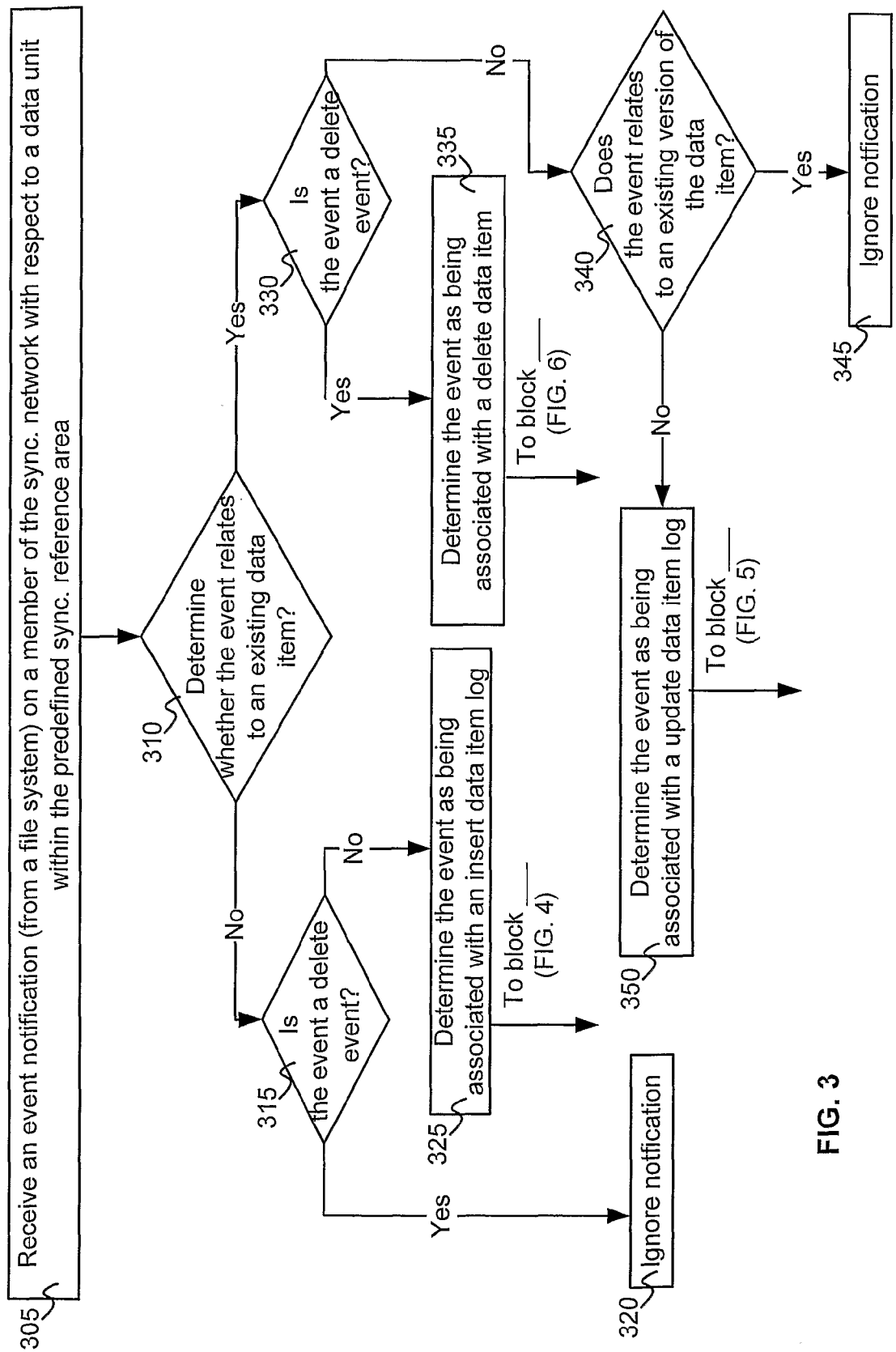
FIG. 3 is a flowchart diagram of a process of processing a notification received in respect of a data unit that is associated with a data item of a P2P synchronization network for determining if the change in respect of the data unit is associated with a change in respect of the data item and in case it is associated with a change, the process may identify what type of change has been applied to the data item, in accordance with some embodiments of the invention.

Reference is now made to FIG. 3, which is a flowchart diagram of a process of processing a notification received in respect of a data unit that is associated with a data item of a P2P synchronization network for determining if the change in respect of the data unit is associated with a change in respect of the data item and in case it is associated with a change, the process may identify what type of change has been applied to the data item, in accordance with some embodiments of the invention. Initially an event notification may be received on a member of a P2P synchronization network, for example from a file system associated with that member of the network, with respect to a data unit within the predefined synchronization reference area that is associated with that P2P synchronization network (block 305). According to some embodiments of the invention, the events which may trigger the event notification may include one or more of the following: a creation of a new data unit, a creation of a new folder with or without a data unit within it, a deletion of an existing data unit, a deletion of a folder with or without a data unit within it, a renaming a data unit or a folder with or without a data unit within it, an updating of an existing data unit (a moving of a data unit or a folder may be considered as a sequence of delete insert event(s)).

Once, an event notification is received, it may be determined, for example by a synchronization logic module in consultation with an associated database, whether it relates to an existing data item (block 310). According to some embodiments of the invention, in order to determine whether an event notification relates to an existing data item, a synchronization logic module for example, may obtain from the event notification a path to the data unit on which the event that is being reported by the event notification occurred, and may determine whether that path is within the predefined synchronization reference are that is associated with a P2P synchronization network which the synchronization logic module is interacting with (the synchronization module is a member of that network). In case the path to the data unit to which the event relates is within a predefined synchronization reference area of interest, it may be determined whether there is a record, for example in a database used for storing data in respect of supported P2P synchronization networks, of a data item that is associated with the path to the data unit that is associated with the event notification (or with a relative path that is derived from that path). If there is such a data item, it may be concluded at block 310 that the event notification relates to an existing data item. Otherwise, it may be concluded at block 310 that the event notification does not relate to an existing data item.

According to some embodiments of the invention, if at block 310 it is determined that the event notification does not relate to an existing data item, it may be checked whether the event to which the notification relates, corresponds to a deletion of a data item (block 315). For example, an event may be determined to be a deletion event based upon the classification of the event provided by the event notification.

According to some embodiments of the invention, if it is determined at block 315 that the event notification corresponds to a deletion of a data item, the event notification is ignored (block 320). It would be appreciated an event notification which corresponds to a deletion of a data item which does not (or no longer) exist in the database can simply be ignored and the status of the data item will correctly represent the status of the data item on the storage associated with that member of the P2P synchronization network.

However, according to some embodiments of the invention, if it is determined at block 310 that the event notification does not relate to an existing data item and the event notification does not correspond to a deletion of a data item (at block 315), the event notification may be determined as being associated with an insertion of a data item (block 325). In accordance with some embodiments of the invention, an identification of an event as being associated with an insertion of a data item may initiate a process of creating a synchronization log in response to receiving a change notification that is identified as being associated with an insertion of a new data item which was not previously part of the P2P synchronization network. An example of such a process is described as part of the description of FIG. 4 that is provided below.

According to some embodiments of the invention, if at block 310 it is determined that the event notification relates to an existing data item, it may be checked whether the event to which the notification relates, corresponds to a deletion of a data item (block 330). According to some embodiments of the invention, if it is determined at block 330 that the event notification corresponds to a deletion of a data item, the event may be identified as being associated with a deletion of a data item (block 335). In accordance with some embodiments of the invention, an identification of an event as being associated with an deletion of a data item may initiate a process of creating a synchronization log in response to receiving a change notification that is identified as being associated with a deletion of a data item. An example of such a process is described as part of the description of FIG. 6 that is provided below.

According to some embodiments of the invention, if it is determined at block 330 that the event notification does not correspond to a deletion of a data item it may be checked whether the event notification relates to an existing version of the data item (block 340). According to some embodiments of the invention, as part of determining whether an event notification relates to an existing version of the data item (after it has been determined in accordance with a relative path contained within the event notification that it relates to an existing data item at block 310), a hash function may be applied to the content of the data unit to which the event notification relates and the resulting hash value may be compared against each hash value within the database that is recorded with reference to the data item that is associated with the event notification. As was explained above, each hash value that is recorded in the database with reference to a certain data item represents a different version of the data item. Thus, according to some embodiments of the invention, if the hash value that has been calculated based upon the content of the data unit to which the event notification relates is equal to a hash value which represents the content of an existing version of the data item, it may be concluded that the data unit to which the event notification relates corresponds to an existing version of the data item.

According to some embodiments of the invention, if it is determined at block 340, that the event notification relates to an existing version of the data item, the event notification may be ignored. It would be appreciated that according to some embodiments of the invention, in a case that an event notification relates to an existing version of a data item, there is no need to take any further action since the data in respect of the version of the data item to which the event notification relates is already implemented within the P2P synchronization network.

However, according to further embodiments of the invention, if it is determined at block 340 that the event notification does not relate to an existing version of the data item, the event notification may be identified as being associated with an updating of an existing data item (block 350). In accordance with some embodiments of the invention, an identification of an event as being associated with an updating of an existing data item may initiate a process of creating a synchronization log in response to receiving a change notification that is identified as being associated with an updating of an existing data item. An example of such a process is described as part of the description of FIG. 5 that is provided below.

An example of such a process is described as part of the description of FIG. 4 that is provided below.

Figure 4:
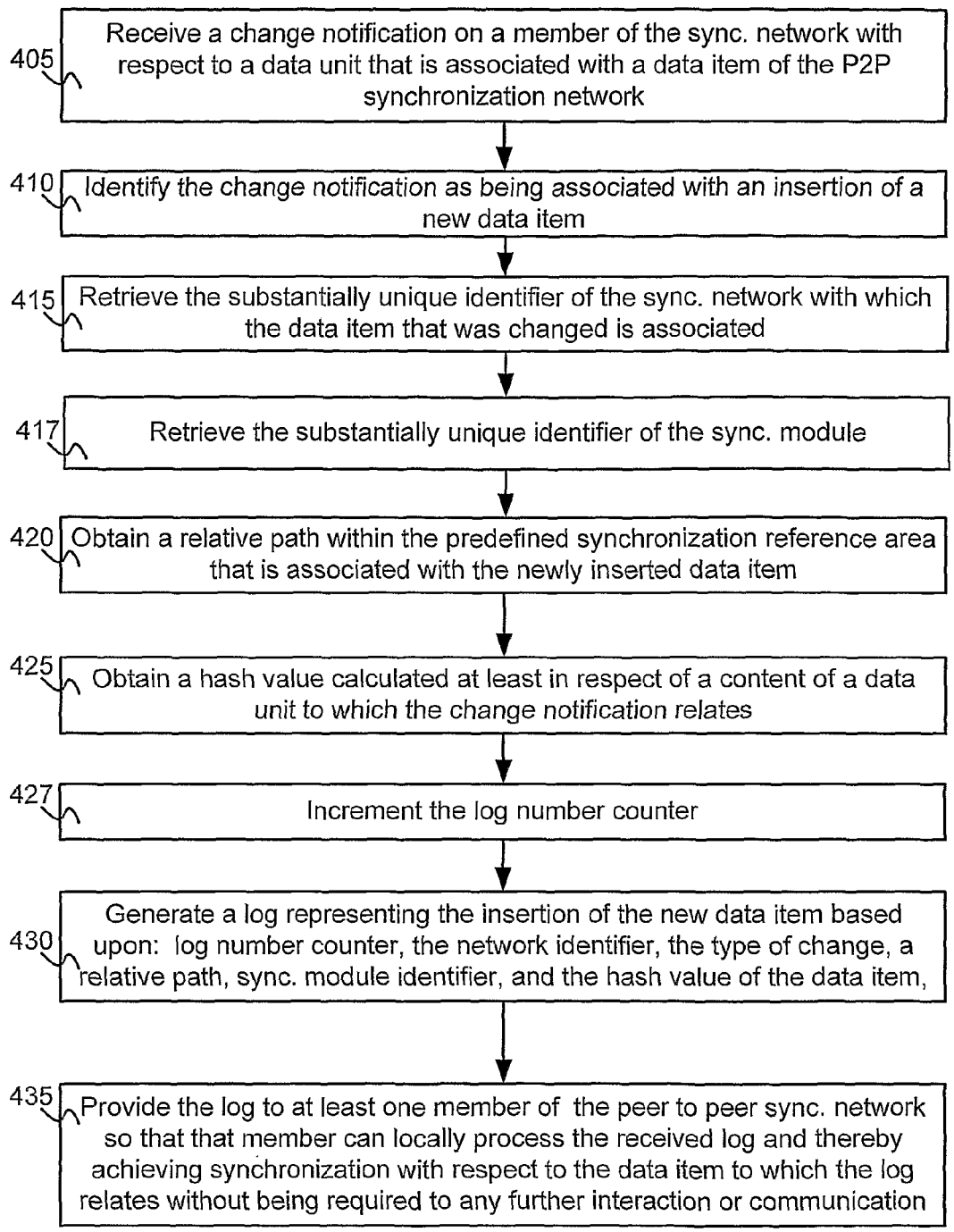
FIG. 4 is a flowchart diagram of a process of creating a synchronization log in response to receiving a change notification that is identified as being associated with an insertion of a new data item which was not previously part of the P2P synchronization network, according to some embodiments of the invention.

Reference is now made to FIG. 4, which is a flowchart diagram of a process of creating a synchronization log in response to receiving a change notification that is identified as being associated with an insertion of a new data item which was not previously part of the P2P synchronization network, according to some embodiments of the invention. Initially a change notification may be received on a member of a P2P synchronization network with respect to a data unit that is associated with a data item of the P2P synchronization network or in response to which a new data item should be created (block 405). For example, according to some embodiments of the invention, a change notification may be received on a member of a P2P synchronization network which indicates that a data unit has been created in a location within the file system, where previously there was not an earlier data unit.

According to some embodiments of the invention, the change notification may be checked, and in accordance with some scenarios, the change notification may be identified as being associated with an insertion of a new data item (block 410). According to some embodiments of the invention, an insertion of a new data item may be identified when a change notification relates to a new data unit whose storage location is within a predefined synchronization reference area that is associated with a certain P2P synchronization network, and a database where data items that are associated with the network does not include a record with respect to a data unit in the location where the new data unit has been created.

Once the change notification has been identified, a sequence of data retrieval and generation that is part of a process of generation a log may be initiated. As part of the sequence of data retrieval and generation, the substantially unique identifier of the sync. network with which the data item that was changed is associated may be retrieved (block 415). In addition, the synchronization module identifier associated with the member of the P2P synchronization network which is creating the log may also be obtained (block 417).

Further as part of the sequence of data retrieval and generation, a relative path within the predefined synchronization reference area that is associated with the newly inserted data item may be obtained (block 420). The relative path is the path from the synchronization root directory which has been defined for the current P2P synchronization network to the newly created data unit that is associated with the inserted data item.

Next, as part of the sequence of data retrieval and generation, a hash value may be calculated in respect of a content of the newly created data unit to which the change notification relates (block 425).

As a final part of the sequence of data retrieval and generation a log counter may be incremented giving rise to an incremented log counter number (block 427). It would be appreciated that the order of the sequence of data retrieval and generation may be otherwise organized and that the order that was described above in not limiting. Furthermore, some blocks which are part of the sequence may occur outside the context of the log generation. For example, a log counter number may be incremented for being used in the process of generating a log (the current log counter number is included as part of the log) immediately following the generation of a previous log so that when the next log is being created, the log counter number is already available.

Next, a synchronization log which represents the insertion of the new data item to the P2P synchronization network may be created. According to some embodiments of the invention the log representing the insertion of the new data item may include each of the following: a log number counter, the network identifier which is uniquely associated with the P2P synchronization network with which the data item that is associated, the type of change (in this case, an insertion) that was applied to the data item with which the log is associated, the ID of the member of the P2P synchronization network which is generating the synchronization log, the relative path that is associated with the changed data item, and the hash value that is based upon the content of the newly created data unit to which log relates (block 430).

Once the synchronization log is created, the log may be forwarded to at least one other member of the P2P synchronization network. According to some embodiments of the invention, the synchronization log transmitted out of the member of the P2P synchronization network may enable another member that is in receipt of the synchronization log to locally process the received log and to achieve synchronization with respect to the data item to which the log relates without being required to any further interaction or communication (block 435). Thus, according to some embodiments of the invention, the synchronization log may include all the data that is required by a member of the P2P synchronization network to become synchronized with respect to the data item.

Figure 5:
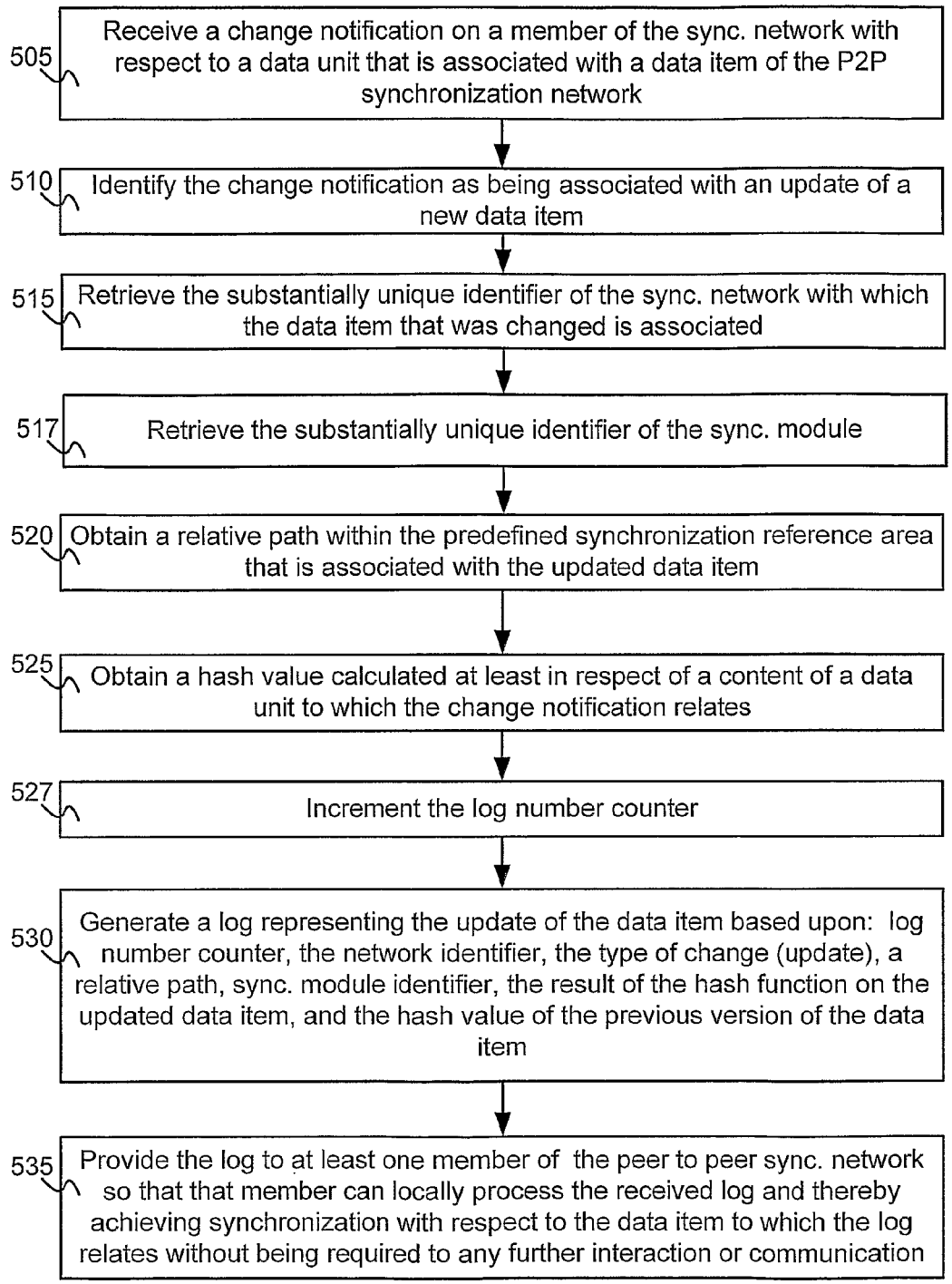
FIG. 5 is a flowchart diagram of a process of creating a synchronization log in response to receiving a change notification that is identified as being associated with an update of a data item which was previously part of the P2P synchronization network, according to some embodiments of the invention

Reference is now made to FIG. 5, which is a flowchart diagram of a process of creating a synchronization log in response to receiving a change notification that is identified as being associated with an update of a data item which was previously part of the P2P synchronization network, according to some embodiments of the invention. Initially a change notification may be received on a member of a P2P synchronization network with respect to a data unit that is associated with a data item of the P2P synchronization network (block 505). For example, according to some embodiments of the invention, a change notification may be received on a member of a P2P synchronization network which indicates that a data unit has been modified in a location within the file system, According to some embodiments of the invention, the change notification may be checked, and in accordance with some scenarios, the change notification may be identified as being associated with an update of a data item (block 510). According to some embodiments of the invention, an update of a data item may be identified when a change notification relates to a data unit whose storage location is within a predefined synchronization reference area that is associated with a certain P2P synchronization network, and a database where data items that are associated with the network does include a record with respect to a data unit in the location where the data unit has been modified.

Once the change notification has been identified, a sequence of data retrieval and generation that is part of a process of generation a log may be initiated. As part of the sequence of data retrieval and generation, the substantially unique identifier of the sync. network with which the data item that was changed is associated may be retrieved (block 515). In addition, the synchronization module identifier associated with the member of the P2P synchronization network which is creating the log may also be obtained (block 517).

Further as part of the sequence of data retrieval and generation, a relative path within the predefined synchronization reference area that is associated with the updated data item may be obtained (block 520). The relative path is the path from the synchronization root directory which has been defined for the current P2P synchronization network to the updated data unit that is associated with the update data item.

Next, as part of the sequence of data retrieval and generation, a hash value may be calculated in respect of a content of the modified data unit to which the change notification relates (block 525).

As a final part of the sequence of data retrieval and generation a log counter may be incremented giving rise to an incremented log counter number (block 527). It would be appreciated that the order of the sequence of data retrieval and generation may be otherwise organized and that the order that was described above in not limiting. Furthermore, some blocks which are part of the sequence may occur outside the context of the log generation. For example, a log counter number may be incremented for being used in the process of generating a log (the current log counter number is included as part of the log) immediately following the generation of a previous log so that when the next log is being created, the log counter number is already available.

Next, a synchronization log which represents the update of the data item to the P2P synchronization network may be created. According to some embodiments of the invention the log representing the update of the new data item may include each of the following: a log number counter, the network identifier which is uniquely associated with the P2P synchronization network with which the data item that is associated, the type of change (in this case, an update) that was applied to the data item with which the log is associated, the ID of the member of the P2P synchronization network which is generating the synchronization log, the relative path that is associated with the changed data item, the hash value that is based upon the content of the updated data unit to which log relates and the hash value of the previous version of the data item stored under the previous version of the data item (block 530).

Once the synchronization log is created, the log may be forwarded to at least one other member of the P2P synchronization network. According to some embodiments of the invention, the synchronization log transmitted out of the member of the P2P synchronization network may enable another member that is in receipt of the synchronization log to locally process the received log and to achieve synchronization with respect to the data item to which the log relates without being required to any further interaction or communication (block 535). Thus, according to some embodiments of the invention, the synchronization log may include all the data that is required by a member of the P2P synchronization network to become synchronized with respect to the data item.

Reference is now made to FIG. 6, which is a flowchart diagram of a process of creating a synchronization log in response to receiving a change notification that is identified as being associated with a deletion of a data item which was previously part of the P2P synchronization network, according to some embodiments of the invention. Initially a change notification may be received on a member of a P2P synchronization network with respect to a data unit that is associated with a data item of the P2P synchronization network (block 605). For example, according to some embodiments of the invention, a change notification may be received on a member of a P2P synchronization network which indicates that a data unit has been deleted in a location within the file system, According to some embodiments of the invention, the change notification may be checked, and in accordance with some scenarios, the change notification may be identified as being associated with a deletion of a data item (block 610). According to some embodiments of the invention, a deletion of a data item may be identified when a change notification relates to a data unit whose storage location is within a predefined synchronization reference area that is associated with a certain P2P synchronization network, and a database where data items that are associated with the network does include a record with respect to a data unit in the location where the data unit has been deleted.

Once the change notification has been identified, a sequence of data retrieval and generation that is part of a process of generation a log may be initiated. As part of the sequence of data retrieval and generation, the substantially unique identifier of the sync. network with which the data item that was changed is associated may be retrieved (block 615). In addition, the synchronization module identifier associated with the member of the P2P synchronization network which is creating the log may also be obtained (block 617).

Further as part of the sequence of data retrieval and generation, a relative path within the predefined synchronization reference area that is associated with the deleted data item may be obtained (block 620). The relative path is the path from the synchronization root directory which has been defined for the current P2P synchronization network to the deleted data unit that is associated with the deleted data item.

Next, as part of the sequence of data retrieval and generation, hash values may be obtained in respect of each other version of the data item associated with the deleted data unit to which the change notification relates (block 625).

As a final part of the sequence of data retrieval and generation a log counter may be incremented giving rise to an incremented log counter number (block 627). It would be appreciated that the order of the sequence of data retrieval and generation may be otherwise organized and that the order that was described above in not limiting. Furthermore, some blocks which are part of the sequence may occur outside the context of the log generation. For example, a log counter number may be incremented for being used in the process of generating a log (the current log counter number is included as part of the log) immediately following the generation of a previous log so that when the next log is being created, the log counter number is already available.

Next, a synchronization log which represents the deletion of the data item to the P2P synchronization network may be created. According to some embodiments of the invention the log representing the deletion of the new data item may include each of the following: a log number counter, the network identifier which is uniquely associated with the P2P synchronization network with which the data item that is associated, the type of change (in this case, a deletion) that was applied to the data item with which the log is associated, the ID of the member of the P2P synchronization network which is generating the synchronization log, the relative path that is associated with the deleted data item, and the hash value(s) of the data item versions of the deleted data unit to which log relates (block 630).

Once the synchronization log is created, the log may be forwarded to at least one other member of the P2P synchronization network. According to some embodiments of the invention, the synchronization log transmitted out of the member of the P2P synchronization network may enable another member that is in receipt of the synchronization log to locally process the received log and to achieve synchronization with respect to the data item to which the log relates without being required to any further interaction or communication (block 635). Thus, according to some embodiments of the invention, the synchronization log may include all the data that is required by a member of the P2P synchronization network to become synchronized with respect to the data item.

Figure 7:
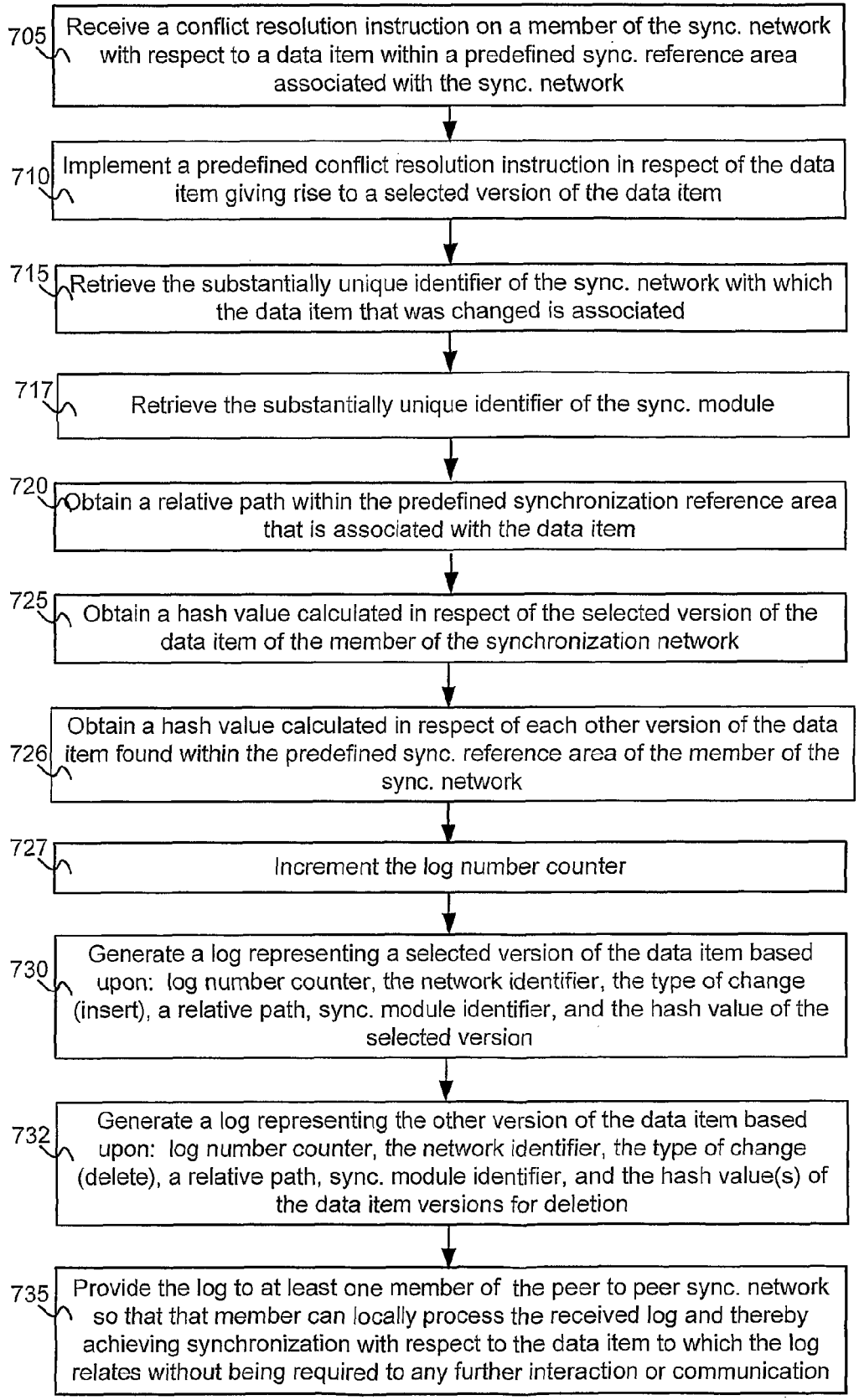
FIG. 7 is a flowchart diagram of a process of creating two synchronization logs (an insert log followed by a delete log) in response conflict resolution instruction that is identified as being associated to a data item which is a part of a synchronization network, in accordance with some embodiments of the invention.

Reference is now made to FIG. 7, which is a flowchart diagram of a process of creating two synchronization logs (an insert log followed by a delete log) in response conflict resolution instruction that is identified as being associated to a data item which is a part of a synchronization network, in accordance with some embodiments of the invention.

Figure 8:
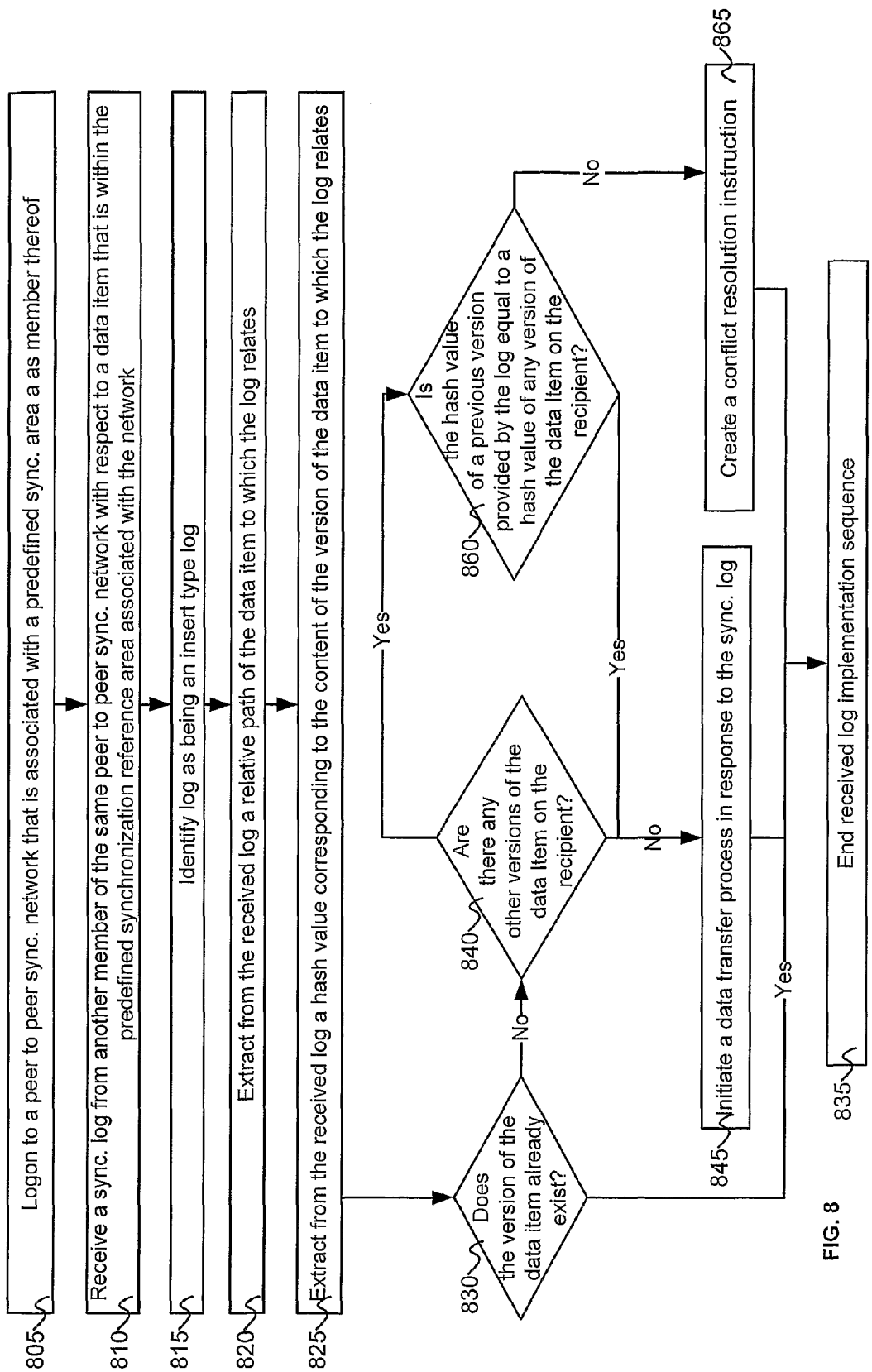
FIG. 8 is a flowchart illustrating a process of implementing an insert type on a member of a P2P synchronization network according to some embodiments of the invention.

Reference is now made to FIG. 8, which is a flowchart illustrating a process of implementing an insert type on a member of a P2P synchronization network according to some embodiments of the invention. According to some embodiments of the invention, initially a member of a peer to peer synchronization network may logon to the network (block 805). For example, a host computer may connect to the Internet and upon connecting the Internet, a synchronization module installed on the host computer may register with a synchronization service (for example, a synchronization authentication and authorization server). If there are other members of the P2P synchronization network which are currently online (this information may be provided by the synchronization service), the member of the network may send a request to a other member of the network with the log counter number of the member to which the request is directed on the requesting member of the network (this represents the last received log from the member to which the request is directed). According to some embodiments of the invention, if the member of the network in receipt of the log request has log(s) with higher counter number(s) it may transmit the log(s) with the higher number(s) to the member of the network that is associated with the log request and the logs may be received at the requesting member of the network (block 810).

Next, a log that is received at the member of the network may be identified as being an insert type log (block 815). According to some embodiments of the invention, data with respect to the type of change applied with respect to the data item to which the log relates may be included in the log itself, and thus determining the type of change to that is associated with a log that is being implemented can be achieved simply by reading the relevant data from the log.

Next, as part of the implementation of an insert type log, a relative path of the data item to which the log relates may be obtained from the log (block 820). It would be appreciated that according to some embodiments of the invention, the relative path of the data item to which the log relates may be used to identify with which data item the log is associated. As mentioned above, each data item within a specific P2P synchronization network is uniquely associated with a specific relative path, and thus the relative path provided by a log being implemented may identify the data item with which the log is associated.

Further as part of the implementation of an insert type log, a hash value corresponding to the content of the version of the data item to which the log relates may be obtained (block 825). The use of a hash value for specifying a version of a data item was described above in detail. Next, it may be determined, for example based on a hash value included as part of the log being implemented, whether the version of the data item to which the log relates already exists on the member of the network that is implementing the log (block 830). For example, according to some embodiments of the invention, the hash value of the version of the data item to which the log relates may be searched in the database record of the data item on the member of the network that is implementing the log. If the same value is found on the member of the network implementing the log under the recorded that is associated with the data item to which the log relates it may be determined that the version of the data item to which the log relates, already exists one the member of the network implementing the log. Otherwise, if the hash value is not found, it may be determined that the version of the data item to which the log relates does not exist on the member of the network implementing the log.

According to some embodiments of the invention, if at block 830 it is determined that the version of the data item to which the log relates already exists on the member of the network which is implementing the log, the received log implementation process may be terminated (block 835). It would be appreciated that in this case, the member of the network which received the log already implemented the changes that the log represents and therefore there is already synchronized with respect to that log.

If however, at block 830 it is determined that the version of the data item to which the log relates does not exist on the member of the network which is implementing the log, it may be determined whether there are any other versions of the data item on the member of the network that is implementing the log (block 840). For example, it may be determined that there are other versions of the data item on the member of the network that is implementing the log if although the hash value included in the log which represent a certain version of the data item to which the log relates is not recorded under the data item on the member of the network which is implementing the log, there are other hash values recorded under that specific data item on the member of the network which is implementing the log. It would be appreciated that according to some embodiments of the invention, the other hash values recorded under the specific data item on the member of the network which is implementing the log may represent other versions of the data item which exist on that member of the network.

According to some embodiments of the invention, if at block 840 it is determined that there are no other versions of the data item to which the log relates on the member of the network implementing the log, a data transfer process may be initiated in response to the synchronization log (block 845) and the received log implementation sequence may be terminated (block 835). According to some embodiments of the invention, the data transfer process may be indented for obtaining the actual data unit(s) that have determined to be missing from the member of the synchronization network which implemented the log.

However, according to some embodiments of the invention, if it is determined at block 840 that there are other versions of the data item to which the log relates on the member of the network implementing the log, it may be determined whether the log includes a hash value of a previous version of the data item to which the log relates that is equal to a hash value of any version of the data item on the member of the network that is in receipt of the log (block 860). If it is determined at block 860, that there is a version on the member of the network that is in receipt of the log whose hash value is equal to a hash value (included in the log) of a previous version of the data item to which the log relates, a data transfer process may be initiated in response to the synchronization log (block 845) and the implementation process in respect of the received log may be terminated (block 835).

It would be appreciated that if there is a version on the member of the network that is in receipt of the log whose hash value is equal to a hash value (included in the log) of a previous version of the data item to which the log relates than taking into account that at block 830 it was determined that the current version of the data item provided by the log is more an update of the data item at the recipient of the log since the current version of the data item that the log is referring to is an update to a previous which is held by the member of the network that is implementing the log.

If however at block 860, that there is not a version on the member of the network that is in receipt of the log whose hash value is equal to a hash value (included in the log) of a previous version of the data item to which the log relates, a conflict resolution instruction may be created (block 865) and the implementation process in respect of the received log may be terminated (block 835).

Figure 9:
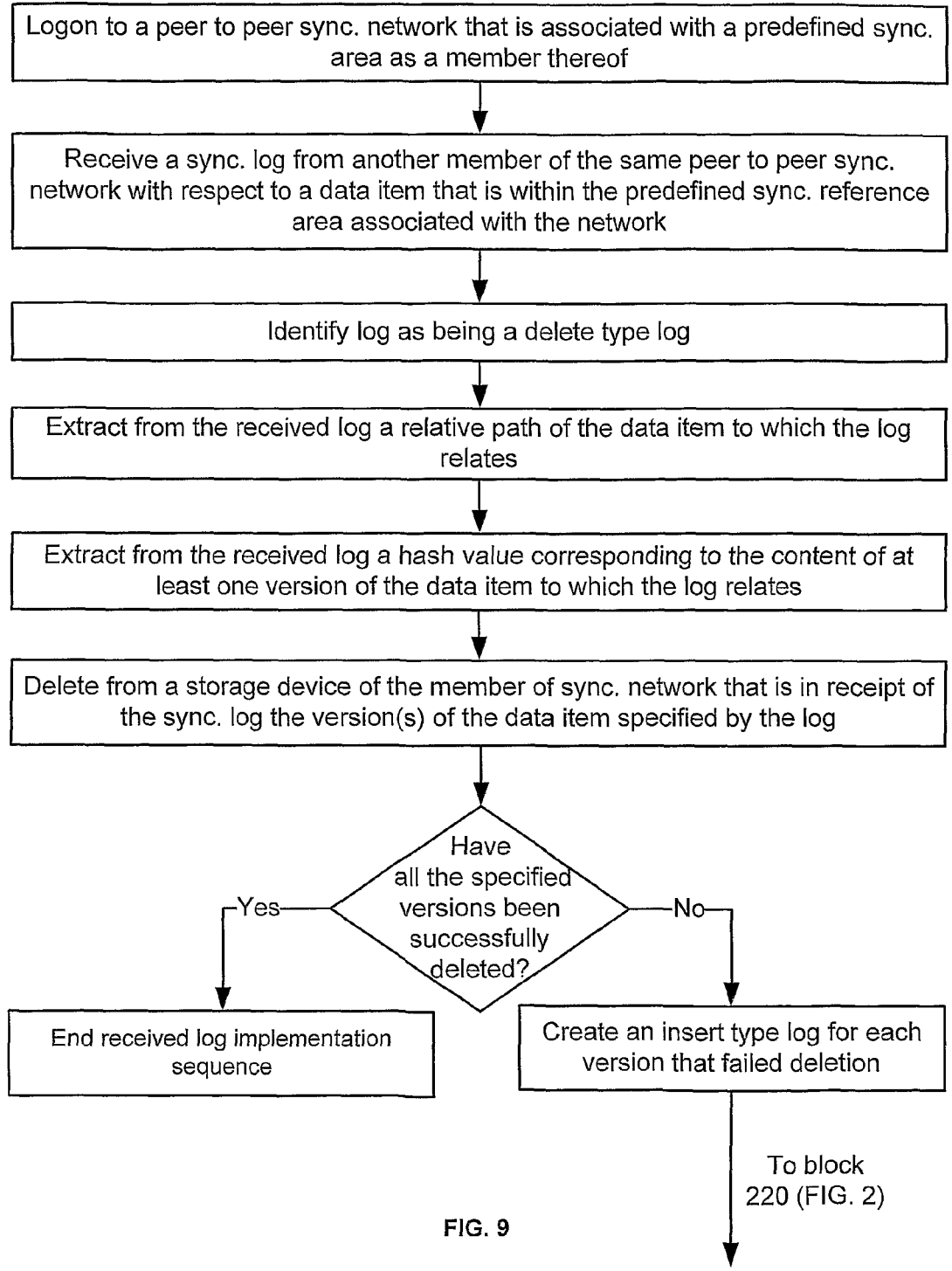
FIG. 9 is a flowchart illustrating a process of implementing a delete type on a member of a P2P synchronization network according to some embodiments of the invention.

FIG. 9, is a flowchart illustrating a process of implementing a delete type on a member of a P2P synchronization network according to some embodiments of the invention.

Figure 12:
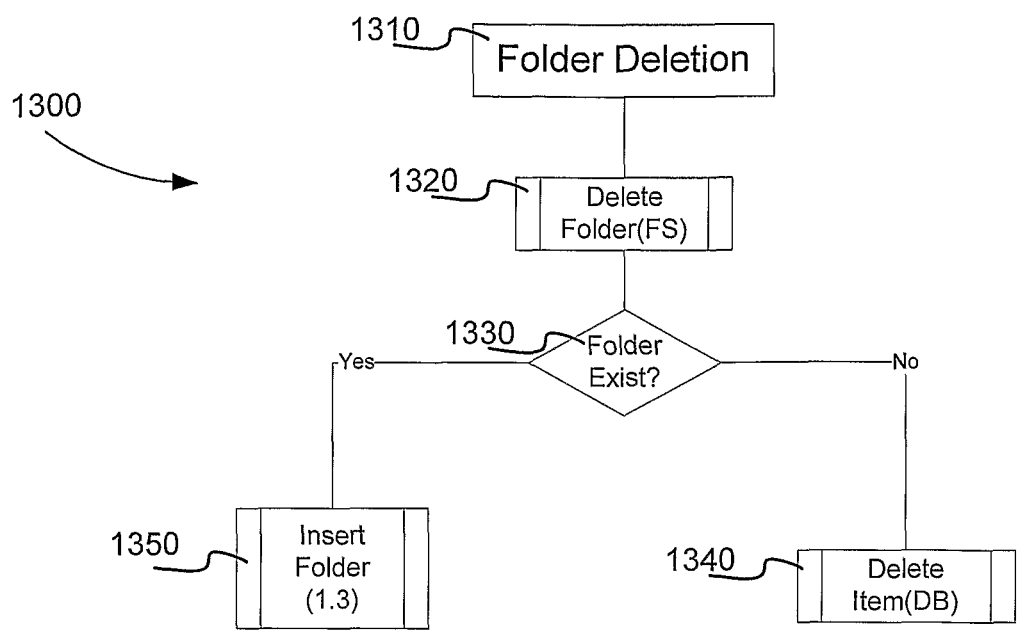
FIG. 12 is a high level block diagram made for convenience and illustration purposes, illustrating the delete folder process and the corresponding actions for a successful and unsuccessful deletion of a folder, in accordance with some embodiments of the invention.

FIG. 12 is a high level block diagram made for convenience and illustration purposes, illustrating the delete folder process and the corresponding actions for a successful and unsuccessful deletion of a folder, in accordance with some embodiments of the invention. (Folder insertion does not have a figure because it was already covered in the text above). It should also be noted that in some embodiments of the present invention the synchronization logic agent (FIG. 1 block 130) may process a delete log and may invoke a folder deletion process 1310. It should be further noted that in some embodiments of the present invention the folder deletion process may delete folder 1320 associated with the storage device. It should also be noted that in further embodiments of the present invention a process of determining if the folder exist 1330 may be invoked. In further embodiments of the present invention the folder exist process 1330 may determines that the folder does not exist the meta data associated with the folder may be deleted too 1340. In other embodiments of the present invention the folder exist process 1330 may determines that the folder does exist after the attempt deletion 1320, the process may re-insert the folder 1350 and may generate a new Folder insertion log.

FIG. 11 is block diagram made for convenience and illustration purposes, illustrating various components of the reevaluate conflict operation, in accordance with some embodiments of the invention. In some embodiments of the present invention the reevaluate conflict routine 1210 may be processed. It should be further noted that in some embodiments of the present invention all versions of a specific data unit may be checked 1220 weather they have a common CRC/HASH. It should be also further noted that in some embodiments of the present invention if some of the versions are duplicated they may be removed 1250, it should be also further noted that if following the removal of a duplicated version 1250 a conflict may be cleared 1260. In some embodiments of the present invention all versions of a specific data unit may be checked 1220 weather they have a common CRC. It should be further noted that in some embodiments of the present invention the data unit versions will have different CRC/HASH values that may create a conflict 1240. It should be also further noted that in the case reevaluate conflict routine 1210 is activated after a delete operation of the version of the Synchronization Reference Area (FIG. 1 Block 172), the select fs version 1230 may move a version with the lowest CRC/HASH value from the conflicted versions (FIG. 1 Block 174) to the synchronization reference area (FIG. 1 Block 172).

Figure 13:
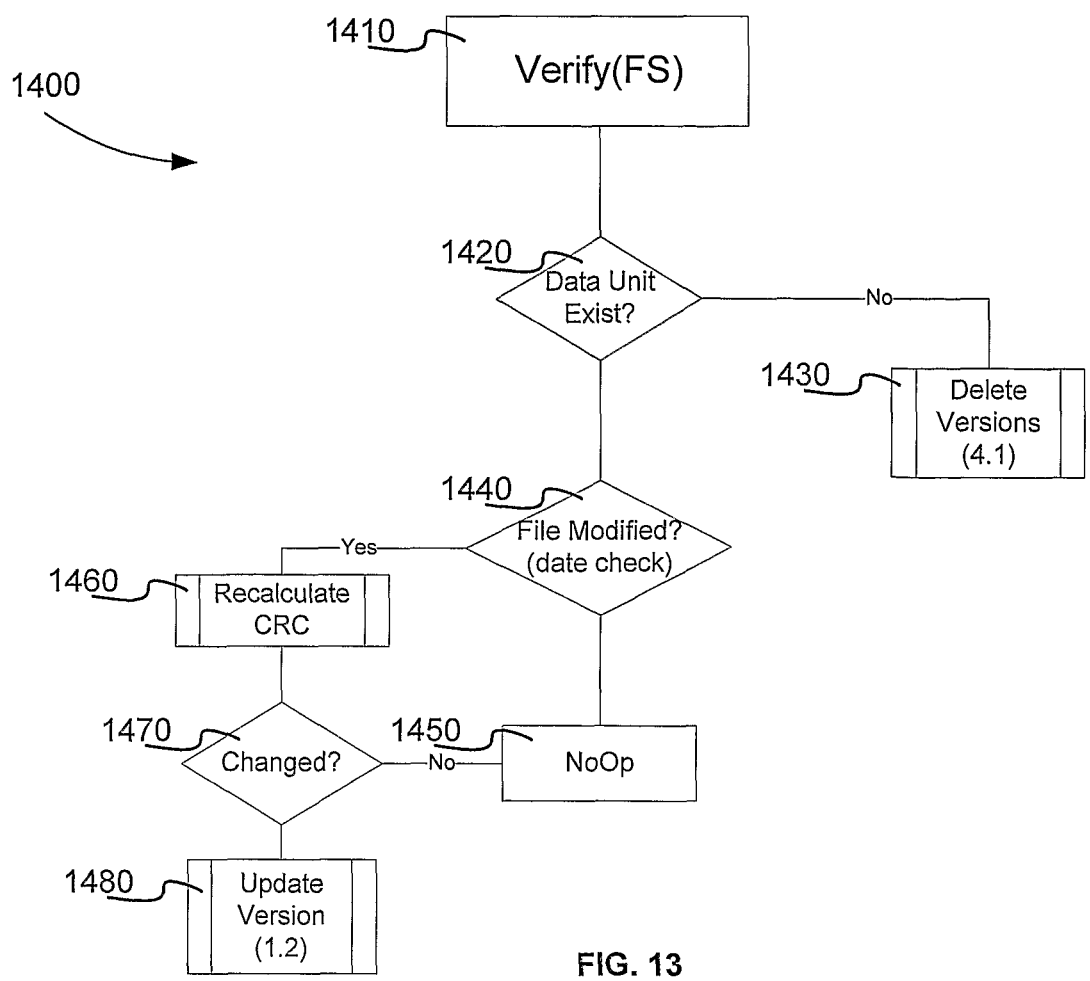
FIG. 13 is a high level block diagram made for convenience and illustration purposes, illustrating the Verify (FS) operation, in accordance with some embodiments of the invention.

FIG. 13 is a high level block diagram made for convenience and illustration purposes, illustrating the Verify (FS) operation 1400. In some embodiments of the present invention Verify(FS) 1410 is used in order to update existing data items of a data unit stored in the database (block 130 FIG. 1) with the data unit information stored on the synchronization reference area (Block 172 FIG. 1) of a Storage Device (Block 170 FIG. 1). It should be further noted that in some embodiments of the present invention that Verify(FS) 1410 may check if the data unit exist 1420. It should be further noted that in some embodiment of the present invention the data unit may not exist 1420 and the data item and versions associated with the data unit may be deleted 1430. It should be further noticed that in other embodiments of the present invention the data unit may exist 1420. It should be further noticed that in some embodiments of the present invention that after verifying that the data unit Exist it will then determine if the data unit date was modified 1440. It should be further noticed that If the data unit date was not modified, Verify(FS) will end successfully and may not amend the data item associated with the data unit 1450. It should be further noted that in some embodiments of the present invention that the data unit date was modified 1440. It should be further noted that if the data unit date was modified, a CRC/HASH to the data unit may be recalculated 1460. It should be further noted that in some embodiments of the present invention if it was determined that a CRC/HASH needs to be recalculated and the recalculated CRC/HASH is identical to the CRC/HASH stored with the data item associated with the data unit, Verify(FS) will end successfully and may not amend the data item associated with the data unit 1450. It should be further noted that in some embodiments of the present invention if it was determined that a CRC/HASH needs to be recalculated and the recalculated CRC/HASH is NOT identical to the CRC/HASH stored with the data item associated with the data unit, an updated version process will be initiated 1480.

Figure 14:
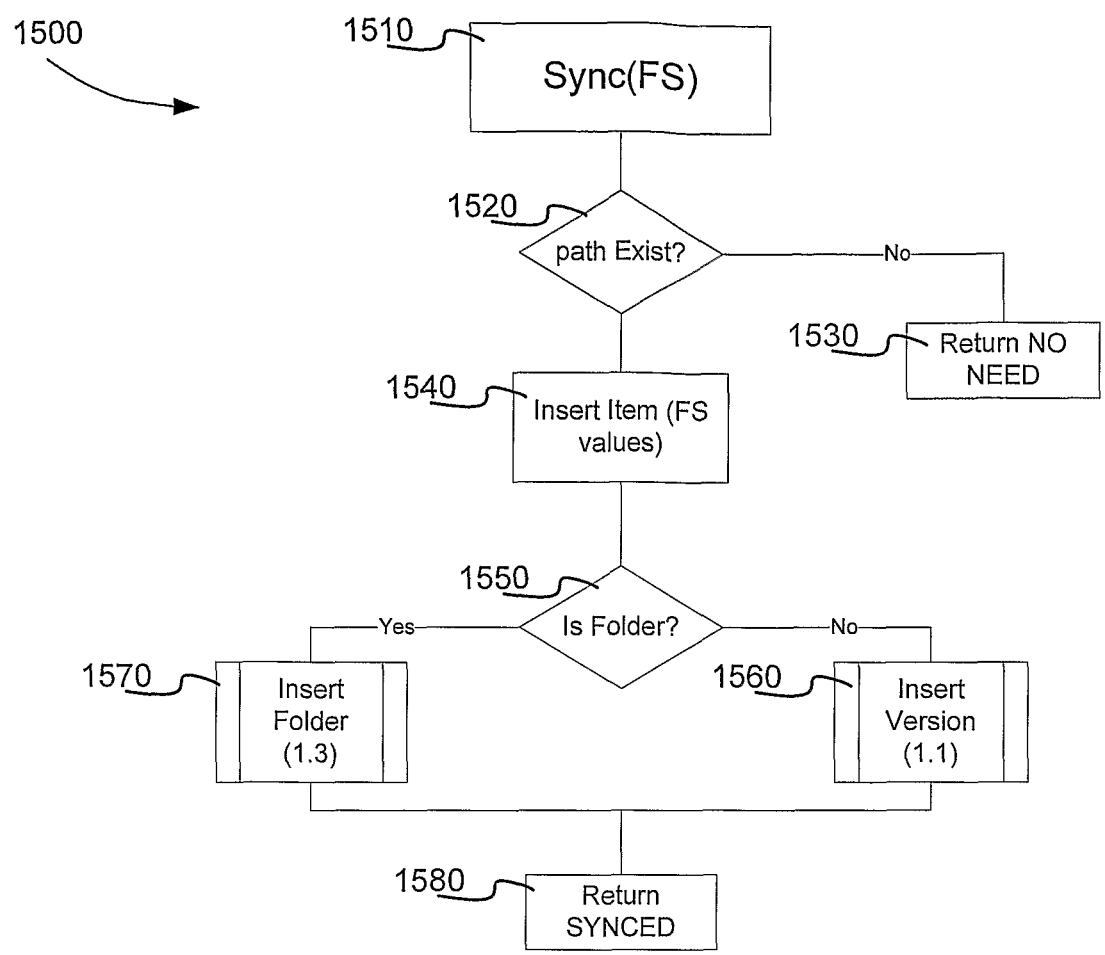
FIG. 14 is a high level block diagram made for convenience and illustration purposes, illustrating the Sync(FS) operation, in accordance with some embodiments of the invention. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

FIG. 14 is a high level block diagram made for convenience and illustration purposes, illustrating the Sync(FS) operation 1500. In some embodiment of the present invention Sync(FS) 1510 is processed when there is no existing data item in the Database (Block 120 FIG. 1) for an insert log that is about to be processed by the synchronization logic agent (Block 130 FIG. 1). It should be further noted that in some embodiments if the present invention it may be determined whether the path of the data unit that is about to be created from the insert log does Exist 1520 on the storage device (Block 170, FIG. 1). It should be further noticed that in some embodiments of the present invention it will be determined that the path does not exist 1520. It should be further noted that in some embodiment of the present invention it is determined that path does not exist, Sync(FS) process will end successfully and may not amend any data item 1530. It should be further noted that in other embodiments of the present invention in will be determined that the path does exist 1520. It should be further noted that in some embodiment of the present invention it is determined that path does exist the values needed for inserting a new log data item may be extracted from the Data Unit that resides on the given path 1540 (these values will be used later for 1560 or 1570). It should be further noted that in some embodiments of the present invention if it was determined that the path exist it may also determine if the existing data unit is a file or folder 1550. It should be further noted that in some embodiments of the present invention it will be determined that the data unit in the given path is a file 1550. It should be further noted that in some embodiments of the present invention and Inserting version operation may be initiated 1560. It should be further noted that in other embodiments of the present invention it will be determined that the data unit in the given path is a folder 1550. It should be further noted that in some embodiments of the present invention and insert folder operation may be initiated 1570. It should also be noted that after inserting either Insert version operation 1560 or an Insert Folder operation 1570 the sync FS process may end successfully 1580.

Figure 10:
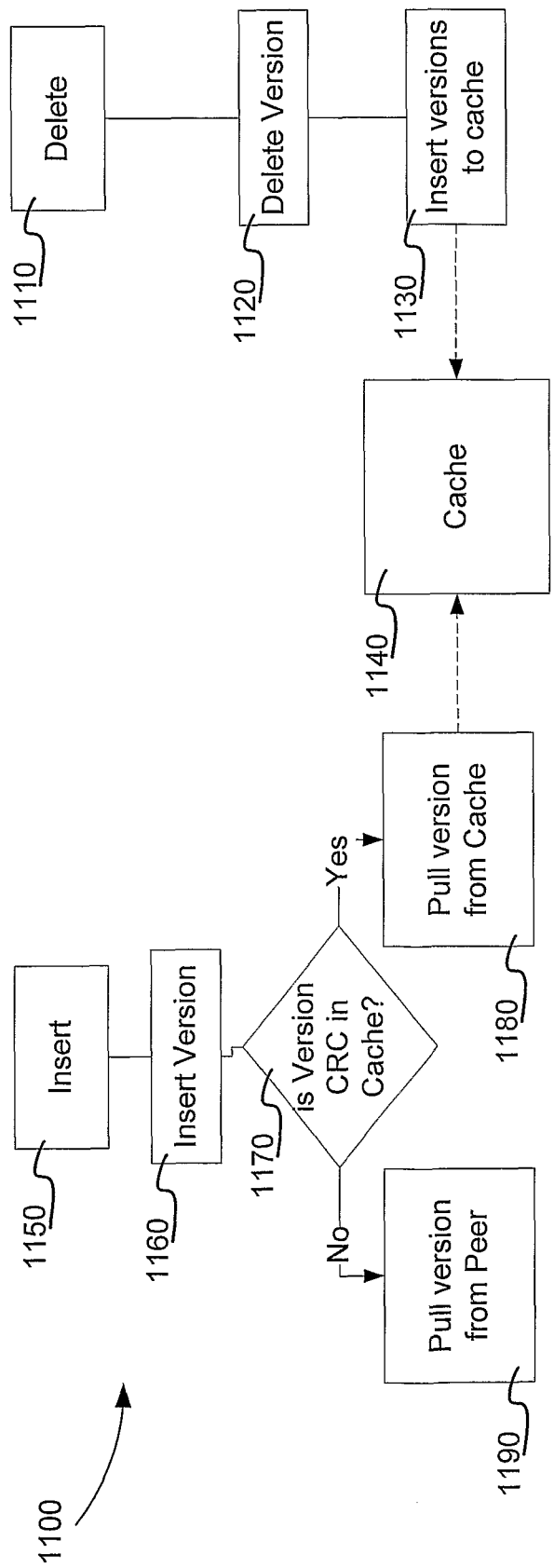
FIG. 10 is a block diagram demonstrating a process of version caching 1100, in accordance with some embodiments of the invention.

In some embodiments of the present invention a version caching method for deleted Data Units is implemented (FIG. 9) in order to prevent the redundant traffic for move and rename operations. FIG. 10 is a block diagram made for convenience and illustration purposes demonstrating the process of version caching 1100, in accordance with some embodiments of the invention. In some embodiment of the present Invention when a delete log is processed it may invoke a delete operation 1110, it should be further noted that in some embodiments of the present invention after the Delete Operation 1110 a version may be deleted 1120, it should also be noted that after a version is marked for deletion it may not be erased from the storage, instead it may be moved to the cache 1130, and may be stored in the cache 1140. In other embodiments of the present invention when an insert log is processed it may initiate an insert operation 1150. It should be further noted that in some embodiments of the present invention when the Inserted version 1160 may be processed it may first ask if the version exists in the cache 1170. It should be further noted that in some embodiments of the present invention if the version does exist in the cache 1140, it may be pulled from the cache 1180. It should also be noted that in some embodiments of the present invention that if the version may not exist in the cache the version may be transmitted from a different peer 1190.

Figure 15:
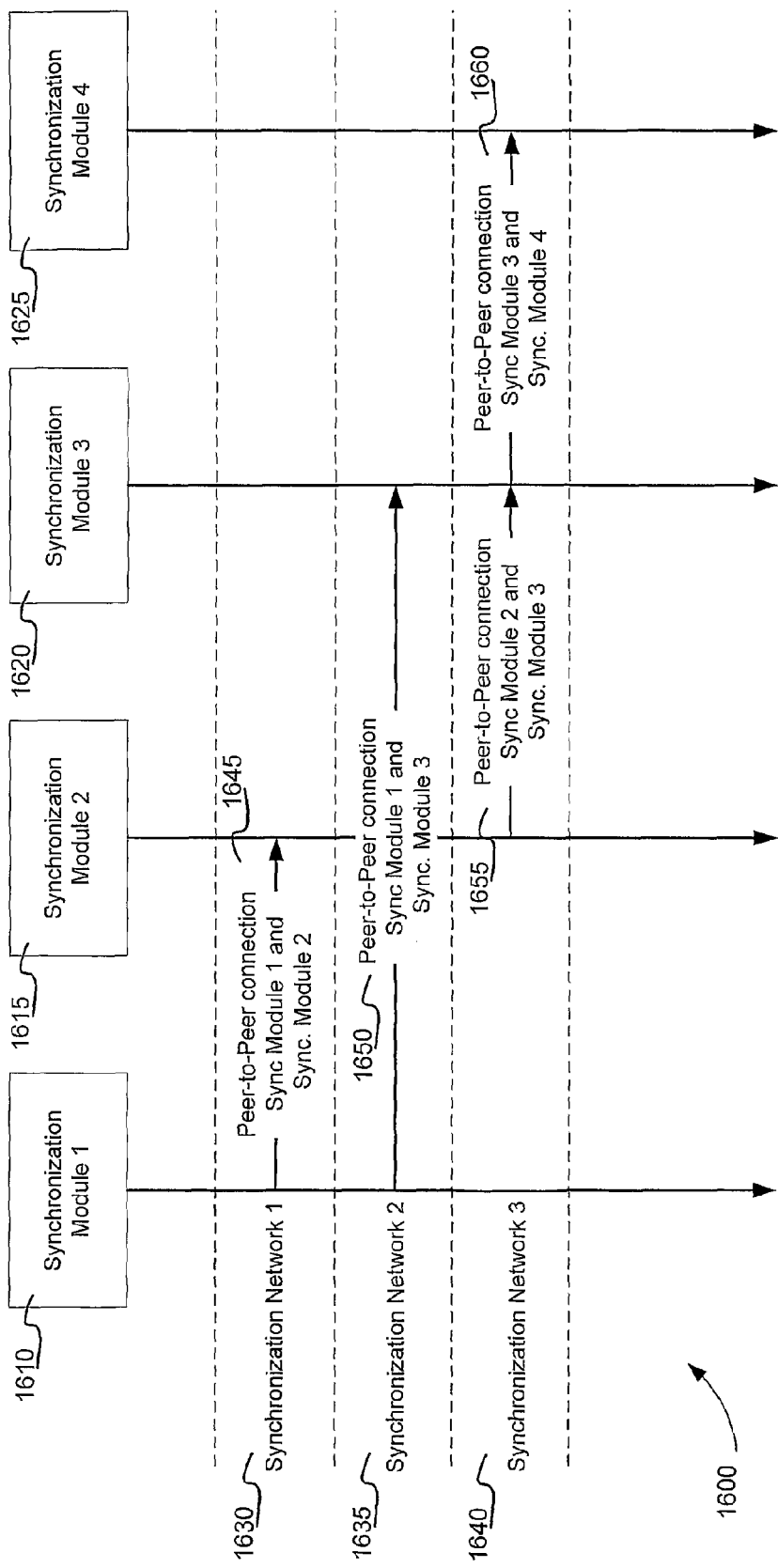
FIG. 15 is a graphical illustration shown a plurality of synchronization module, some of which being associated with only one peer to peer synchronization network, while other synchronization modules are associated with a plurality (two or more) of peer to peer synchronization networks.

FIG. 15 is a graphical illustration shown a plurality of synchronization module, some of which being associated with only one peer to peer synchronization network, while other synchronization modules are associated with a plurality (two or more) of peer to peer synchronization networks.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

The invention claimed is:

1. A method of enabling peer to peer synchronization between members of a synchronization network, the synchronization network being implemented in respect of a predefined synchronization reference area on each network member, the method comprising:
    detecting, on a first member of the synchronization network, a change to a data item within the predefined synchronization reference area;
    determining a type of the change made to the data item;
    determining a relative path within the predefined synchronization reference area to the data item associated with the change;
    obtaining a current version value calculated based upon content of a current version of the data item on said first member of the synchronization network;
    upon determining that a previous version of the data item exists on said first member of the synchronization network, obtaining a previous version value calculated based upon content associated with the previous version of the data item;
    obtaining a current log number counter on said first member of the synchronization network, the current log counter being associated with an incremental count of logs that is updated with each change made to data items of the synchronization network on said first member of the synchronization network;
    generating a log representing the change based upon: a current log number on said first member of the synchronization network, the type of change, the relative path to the data item associated with the change, the current version value, and if a previous version of the data item exists, the previous version value,
    wherein said generating a log further comprises, in case that the change is associated with implementing on said first member of the synchronization network a different log received from another member of the synchronization network, including in the log representing the change on said first member of the synchronization network a member identifier of said other member of the synchronization network and the number of the different log on said other member of the synchronization network; and
    forwarding the log to two or more members of the synchronization network, wherein said log enables two or more members of the synchronization network to synchronize the data item through local processing of the log from the first member on said two or more members of the synchronization network.

2. The method according to claim 1, wherein the current version of the data item is a data unit associated with the change, and wherein the value associated with the current version of the data item is based upon content of the data unit associated with the change.

3. The method according to claim 2, wherein the previous version of the data item is a version of the data unit which was the current version of the data item immediately previous to the change, and wherein the value associated with the previous version of the data item is based upon a content of the version of the data unit which was the current version of the data item immediately previous to the change.

4. The method according to claim 3, wherein said determining the type of the change comprises:
    determining whether the change relates to a data item of said synchronization network which existed on said first member of the synchronization network previous to the change;
    determining whether the type of the change is delete data item; and
    determining the type of the change to be insert data item if the change relates to a data item which did not exist on said first member of the synchronization network previous to the change and providing that the change is not of type delete data item.

5. The method according to claim 4, wherein said determining the type of the change comprises, determining the type of the change to be delete data item if the change relates to a data item which existed on said first member of the synchronization network previous to the change and providing that the change is of type delete data item.

6. The method according to claim 5, wherein said determining the type of the change comprises, determining the type of the change to be an update data item if the change relates to a data item which existed on said first member of the synchronization network previous to the change and providing that the change is not of type delete data item.

7. The method according to claim 5, wherein in case the type of the change is delete data item, and in addition to the previous version of the data item there is a record on said first member of the synchronization network of one or more prior version of the data item which preceded the previous version of the data item, said generating a log is further based on a value corresponding to each prior version of the data item, and wherein the value associated with each prior version of the data item corresponds to the content of a respective version of the data item.

8. The method according to claim 4, wherein said determining whether the change relates to a data item of said synchronization network which existed on said first member of the synchronization network previous to the change comprises, determining the change to be in respect of a data item of said synchronization network which existed on said first member of the synchronization network previous to the change, if there is a previous record of a data item of said synchronization network which is associated with the same relative path within the predefined synchronization reference area as the relative path to the data unit associated with the change.

9. The method according to claim 1, wherein said log enables said two or more members of the synchronization network to synchronize the data item without being dependent upon any further communication or interaction with any other member of the synchronization network including said first member of the synchronization network.

10. The method according to claim 1, further comprising:
    obtaining a network identifier of said synchronization network, said network identifier identifying said synchronization network from one or more other synchronization networks; and
    obtaining a member identifier of said first member within said synchronization network, said member identifier identifying said first member of the synchronization network from one or more other members of the synchronization network, and
    wherein said generating a log representing the change is further based upon: said network identifier associated with the synchronization network and said unique member identifier associated with said first member of the synchronization network.

11. The method according to claim 10, wherein said generating a log further comprises, adding to said log data in respect of a log number on another member of the synchronization network in case the change to which the log relates is associated with implementing of a log received at said first member of the synchronization network from the other member of the synchronization network.

12. The method according to claim 1, further comprising updating an incremental count of logs that is associated with said first member of the network in response to a change occurring on said first member of the synchronization network with respect to a data item of said synchronization network.

13. A program storage device which performs a method of enabling peer to peer synchronization between members of a synchronization network, the synchronization network being implemented in respect of a predefined synchronization reference area on each network member, the device comprising:
    one or more processors; and
    a machine readable medium comprises one or more sequences of instructions, which when executed by the one or more processors, cause:
        detecting on a first member of the synchronization network a change with respect to a data unit within the predefined synchronization reference area, the data unit is associated with a data item of the synchronization network;
        determining a relative path within the predefined synchronization reference area to the data unit associated with the change;
        determining a type of the change;
        obtaining a value calculated based upon a content of the current version of the data item on said first member of the synchronization network;
        if a previous version of the data item exists on said first member of the synchronization network, obtaining a value calculated based upon a content of a data unit that is associated with a previous version of the data item;
        obtaining a current log number for said first member of the synchronization network, the current log number is associated with an incremental count of logs that is updated in connection with a change occurring with respect to a data item of said synchronization network on said first member of the synchronization network;
        generating a log representing the change based upon: a current log number on said first member of the synchronization network, said type of change, said relative path, said value corresponding to the content of a current version of the data item, and if a previous version of the data item exists, the value corresponding to the content of the previous version of the data item,
        wherein said generating a log further comprises, in case that the change is associated with implementing on said first member of the synchronization network a different log received from another member of the synchronization network, including in the log representing the change on said first member of the synchronization network a member identifier of said other member of the synchronization network and the number of the different log on said other member of the synchronization network; and
        forwarding the log to two or more members of the synchronization network.

14. A computer program product comprising a computer useable medium having computer readable program code embodied therein of enabling peer to peer synchronization between members of a synchronization network, the synchronization network is implemented in respect of a predefined synchronization reference area on each network member, the computer program product comprising:
    computer readable program code for causing the computer to detect on a first member of the synchronization network a change with respect to a data unit within the predefined synchronization reference area, the data unit is associated with a data item of the synchronization network;
    computer readable program code for causing the computer to determine a relative path within the predefined synchronization reference area to the data unit associated with the change;
    computer readable program code for causing the computer to determine a type of the change;
    computer readable program code for causing the computer to obtain a value calculated based upon a content of the current version of the data item on said first member of the synchronization network;
    computer readable program code for causing the computer to obtain a value calculated based upon a content of a data unit that is associated with a previous version of the data item, if a previous version of the data item exists on said first member of the synchronization network;

computer readable program code for causing the computer to obtain a current log number for said first member of the synchronization network, the current log number is associated with an incremental count of logs that is updated in connection with a change occurring with respect to a data item of said synchronization network on said first member of the synchronization network;

computer readable program code for causing the computer to generate a log representing the change based upon: a current log number on said first member of the synchronization network, said type of change, said relative path, said value corresponding to the content of a current version of the data item, and if a previous version of the data item exists, the value corresponding to the content of the previous version of the data item wherein causing the computer to generate a log further comprises, in case that the change is associated with implementing on said first member of the synchronization network a different log received from another member of the synchronization network, including in the log representing the change on said first member of the synchronization network a member identifier of said other member of the synchronization network and the number of the different log on said other member of the synchronization network; and computer readable program code for causing the computer to forward the log to two or more members of the synchronization network.

\* \* \* \* \*